United States Patent [19]
Garlic

[11] 3,943,495
[45] Mar. 9, 1976

[54] MICROPROCESSOR WITH IMMEDIATE AND INDIRECT ADDRESSING

[75] Inventor: Richard A. Garlic, Irvine, Calif.

[73] Assignee: Xerox Corporation, Stamford, Conn.

[22] Filed: Dec. 26, 1973

[21] Appl. No.: 428,632

[52] U.S. Cl. ............................................. 340/172.5
[51] Int. Cl.[2] ........................................... G06F 9/00
[58] Field of Search...................... 340/172.5; 444/1

[56] References Cited
UNITED STATES PATENTS

| | | | |
|---|---|---|---|
| 3,061,192 | 10/1962 | Terzian............................ | 340/172.5 |
| 3,315,235 | 4/1967 | Carneuale et al................ | 340/172.5 |
| 3,374,466 | 3/1968 | Hanf et al........................ | 340/172.5 |
| 3,689,895 | 9/1972 | Kitamura......................... | 340/172.5 |

OTHER PUBLICATIONS

Hill et al. – *Digital Systems: Hardware Organization and Design* – Feb. 1973 – pp. 241–247.

*Primary Examiner*—Joseph F. Ruggiero
*Attorney, Agent, or Firm*—James J. Ralabate; Franklyn C. Weiss; Anthony J. Sarli, Jr.

[57] ABSTRACT

A microprocessor with a bus structure for carrying address and data signals wherein an address may be modified by an index value for indirect addressing by deriving said index value from an index register or a control word field. Immediate addressing is provided on branch instructions by providing two separate incrementing paths to avoid loss of a machine cycle during branch.

12 Claims, 39 Drawing Figures

FIG. 9

| 0 | 1 2 3 | 4 | 5 6 7 | 8 9 | 10 11 | 12 13 14 15 | 16 17 18 19 | 20 21 22 23 | 24 25 26 27 | 28 29 30 31 |
|---|---|---|---|---|---|---|---|---|---|---|
| IOM | RA SELECT | ALUM | RB SELECT | A BUS CONTROL | B BUS CONTROL | C BUS/REGISTER CONTROL | BRANCH CONTROL | — | — | — |
| 0 | | | | | N3 | Nx 'B' | | ALU SELECT | MCR CONTROL | DEVICE SELECT |
| 0 | | | | | N3 | Nx 'B' | | OTHER FUNCTIONS | MCR = A | DEVICE SELECT |
| 0 | | | | | 3 | Nx 'B' | | ALU SELECT | EMIT FIELD | |
| 0 | | | | | | X' B | Nx'1' | IMMEDIATE ADDRESS FIELD | | |
| 0 | | | | | | X' B | x'1' | | MCR = x'3' + x'7' | |
| 1 | | | | | N3 | Nx'B | | ALU SELECT | IO CONTROL | DEVICE SELECT |
| 1 | | | | | 3 | | | | | |
| | | | | | | | | BIT POSITION | | |

FUNCTIONS OF ALU SELECT

| ALU MODE BRANCH CONTROL 20-23 | 0 X'0' ARITHMETIC Cn=0 | 0 X'1' ARITHMETIC Cn=1 | 1 LOGIC |
|---|---|---|---|
| 0 | C ← A | C ← A PLUS 1 | C ← $\bar{A}$ |
| 1 | C ← A+B | C ← (A+B) PLUS 1 | C ← $\overline{A+B}$ |
| 2 | C ← A+$\bar{B}$ | C ← (A+$\bar{B}$) PLUS 1 | C ← $\bar{A}$·B |
| 3 | C ← MINUS 1 | C ← 0 | C ← 0 |
| 4 | C ← A PLUS A·$\bar{B}$ | C ← A PLUS A·$\bar{B}$ PLUS 1 | C ← $\overline{A·B}$ |
| 5 | C ← (A+B) PLUS A·$\bar{B}$ | C ← (A+B) PLUS A·$\bar{B}$ PLUS 1 | C ← $\bar{B}$ |
| 6 | C ← A MINUS B MINUS 1 | C ← A MINUS B | C ← A⊕B |
| 7 | C ← A·$\bar{B}$ MINUS 1 | C ← A·$\bar{B}$ | C ← A·$\bar{B}$ |
| 8 | C ← A PLUS A·B | C ← A PLUS A·B PLUS 1 | C ← $\bar{A}$+B |
| 9 | C ← A PLUS B | C ← A PLUS B PLUS 1 | C ← $\overline{A⊕B}$ |
| A | C ← (A+$\bar{B}$) PLUS A·B | C ← (A+$\bar{B}$) PLUS A·B PLUS 1 | C ← B |
| B | C ← A·B MINUS 1 | C ← A·B | C ← A·B |
| C | C ← A PLUS A | C ← A PLUS A PLUS 1 | C ← 1's |
| D | C ← (A+B) PLUS A | C ← (A+B) PLUS A PLUS 1 | C ← A+$\bar{B}$ |
| E | C ← (A+$\bar{B}$) PLUS A | C ← (A+$\bar{B}$) PLUS A PLUS 1 | C ← A+B |
| F | C ← A MINUS 1 | C ← A | C ← A |

FIG. 11

| 5 | 6 | 7 | OCTAL | 0   B BUS CONTENTS   15 |
|---|---|---|---|---|
| 0 | 0 | 0 | 0 | 0 0 0 0 0 0 0 0 0 0 0 0 0 0 0 1 |
| 0 | 0 | 1 | 1 | 0 0 0 0 0 0 0 0 0 0 0 0 0 0 1 0 |
| 0 | 1 | 0 | 2 | 0 0 0 0 0 0 0 0 0 0 0 0 0 1 0 0 |
| 0 | 1 | 1 | 3 | 0 0 0 0 0 0 0 0 0 0 0 0 1 0 0 0 |
| 1 | 0 | 0 | 4 | 0 0 0 0 0 0 0 0 0 0 0 1 0 0 0 0 |
| 1 | 0 | 1 | 5 | 0 0 0 0 0 0 0 0 0 0 1 0 0 0 0 0 |
| 1 | 1 | 0 | 6 | 0 0 0 0 0 0 0 0 0 1 0 0 0 0 0 0 |
| 1 | 1 | 1 | 7 | 0 0 0 0 0 0 0 0 1 0 0 0 0 0 0 0 |

BIT POSITION ASSIGNMENTS

FIG. 12

| | 0 | 1 2 3 | 4 5 6 7 | 8 9 | 10 11 | 12 13 14 15 | 16 17 18 19 | 20 21 22 23 | 24 25 26 27 | 28 29 30 31 |
|---|---|---|---|---|---|---|---|---|---|---|
| | I O M | RA SELECT | RB SELECT | A BUS CONT. | B BUS CONT. | C BUS / REG. CONTROL | BRANCH CONTROL | ALU SELECT | | |
| A——GRn | 0 | 0–7 | | N3 | | NB | | | | |
| A——IOn | 1 | 0–7 | | N3 | | NB | | | | |
| A(4–15)——MAR(0–11) | | | | 3 | | B | | | | |
| A(4–15)——MCR(20-31) | 0 | | | | N3 | NB | | | MCR=3+5 | |
| A(4–15)——V1+V2 | 0 | | | | N3 | NB | | | MCB=E | |
| A——DA | | | | | | | | | | |
| B(8–15)——1 | 1 | | 0–7 | | 3 | | | | | |
| B——GRn | | | 0–7 | | N3 | | | | MOR=7 | |
| B(8–15)——MCR(20-31) | 0 | | | | 3 | NB | | | | |
| B——AGR | 0 | | | | N3 | NB | | | | |
| C——ALU | | | | | | NB | 0+1 | | MCR≠7 | |
| C——SP/MM | | | | | | NB | 2 | | | |
| C(4–15)——PS(0–11) | | | | | | B | 7 | | | |
| C——CM | | | | | | | | | MCR=0 | |
| C——MGP | 0 | | | | N3 | | (VIA A, ALU) | | MCR=8 | |
| C(4–15)——MCR(20-31) | | | | | | | | | | |

FIG. 13 MICROPROGRAMMING OF BUS SOURCES

| | 0 | 1 2 3 | 4 | 5 6 7 | 8 9 | 10 11 | 12 13 14 15 |
|---|---|---|---|---|---|---|---|
| | I O M | RA SELECT | | RB SELECT | A BUS | B BUS | C BUS / REGISTER CONTROL |
| ALU-A (0-15) ⟶ A(0-15) | | | | | 0 | | |
| ALU-A (0-15) ⟶ A(0-7) | | | | | 1 | | |
| ALU-A (8-15) ⟶ A(8-15) | | | | | 2 | | |
| ALU-A (4-15) ⟶ A(4-15) | | | | | 3 | | |
| ALU-B (0-15) ⟶ B(0-15) | | | | | 0 | | |
| ALU-B (8-15) ⟶ B(0-7) | | | | | 1 | | |
| ALU-B (8-15) ⟶ B(8-15) | | | | | 2 | | |
| ALU-B (8-15) ⟶ B(8-15) | | | | | 3 | | |
| IOn (0-15)+GRn (0-15) ⟶ C(0-15) | 1+0 | 0-7 | | 0-7 | | | 2, 4, 6, A, C, E, F |
| IOn (0-7)+GRn (0-7) ⟶ C(0-7) | 1+0 | 0-7 | | 0-7 | | | 2, 4, 6, A, C, E, F |
| IOn (8-15)+GRn (8-15) ⟶ C(8-15) | 1+0 | 0-7 | | 0-7 | | | 2, 4, 6, A, C, E, F |
| IOn (0-15)+GRn (0-15) ⟶ C(0-15) | 1+0 | 0-7 | | 0-7 | | | 2, 4, 6, A, C, E, F |
| GRn (0-15) ⟶ C(0-15) | | | | | | 0 | 3, 5, 7 |
| GRn (0-7) ⟶ C(0-7) | | | | | | 1 | 3, 5, 7 |
| GRn (8-15) ⟶ C(8-15) | | | | | | 2 | 3, 5, 7 |
| GRn (0-15) ⟶ C(0-15) | | | | | | 3 | 3, 5, 7 |

WORD/BYTE OPERATION

*FIG. 14*

FIG. 15 RELATIVE ADDRESSING

MICROPROCESSOR WITH IMMEDIATE AND INDIRECT ADDRESSING

TABLE OF CONTENTS

Abstract of the Disclosure
Background of the Invention
  Field of the Invention
  Description of the Prior Art
Summary of the Invention
Brief Description of the Drawings
Detailed Description of a Preferred Embodiment
  System Organization
  Instruction Flow
  Data Flow
  Arithmetic and Logic Unit (ALU)
  General Registers
  Status
  Input/Output
  Scratch Pads/Main Memory
  Translator
  Maintenance Control Panel
  Information Flow: Summary
  Interrupt Flow
Microinstruction Repertoire
  Single Purpose Micro Fields
  Multiple Purpose Fields
Word/Byte Operation
Set/Reset/Test A Bit
Addressing and Branching
Sample Microprogram
System Input/Output
I/O Interrupt

BACKGROUND OF THE INVENTION

1. Field of the Invention

This invention relates to microprocessors and more particularly to addressing techniques for addressing a processor main memory or microcontrol memory.

2. Description of the Prior Art

In digital processing apparatus which is sequentially executing a group of instructions which may be in the form of a program, it is frequently necessary, because of external interrupt or need for repeatable execution of a sub-set of instructions or a subroutine, to branch from the sequential execution of the main program to such a subroutine. When such a branch occurs it is frequently necessary ot lose one complete machine cycle, since a new address must be applied to the program storage means and must at the same time be incremented by one to extract the subsequent instruction from the subroutine.

Further, in executing a program it is frequently necessary because of address field limitations of a processor to provide for indirect addressing whereby an incremental number is added to a instruction address or an operand address to extract the required instruction or operand from a portion of the instruction or data storage device. This incremental number or index value is most commonly stored in an index register which must be updated each time the index is to be modified for execution of a different portion of the program.

SUMMARY OF THE INVENTION

The instant invention provides a microprocessor with a bus structure for carrying both address and data signals, and with a microcontrol word structure such that an index value may be carried as a field of the control word to be added to or subtracted from the extracted address according to the direction supply by the control word. Further, in the instant invention, immediate addressing is provided on branch instructions or interrupt instructions by providing two separate incrementing paths whereby the branched-to-address may be immediately loaded in the instruction address register and its incremented address formed during the same cycle and, still during the same cycle placed in the instruction address register to provide the incremented address for the next succeeding machine cycle.

An object of the invention is to provide a processor in which memory operations are performed in a parallel mode.

A further object of the invention is to provide a processor in which Read Only Memory operations are performed in a parallel mode.

A still further object of the invention is to provide a processor with a single-phase fixed clock system.

A further object of the invention is to provide a processor with a double interrupt system for both multiplexed and high speed data transfer for real time operation.

A further object is to provide a microprocessor in which the control memory can branch from one program segment to another without losing a machine cycle time of the single phase clock.

Another object of the invention is to provide a processor capable of extended or relative addressing of control or main memory in a single machine cycle time.

A still further object of the invention is to provide a processor in which the clock is single phase and controllable by the user to allow connection of peripheral devices of varying speeds.

These and other objects, features, and advantages of the invention will become more apparent when the following description is read in conjunction with the drawings, in which:

FIG. 9 is a diagram showing the locations of the micro fields in a microinstruction used by the device of the instant invention.

FIG. 11 is a table describing the functions of the ALU Select field of a microinstruction.

FIG. 12 is a table showing bit position assignments of the B Bus.

FIG. 13 is a table describing the Microprogramming of Bus sources.

FIG. 14 is a table showing Word/Byte operation of the device.

FIG. 15 is a table showing the relative addressing feature of the device as represented in a microinstruction.

DETAILED DESCRIPTION OF A PREFERRED EMBODIMENT

In a preferred embodiment, a microprogrammed data processor may consist of a device organized in a generalized three-bus structure where the functional processing units are interconnected between operative buses by means of tri-state logic.

Tri-state logic allows each unit to either drive, receive from, or present a high impedance to the buses under control of a microcontrol register.

Figure 1:
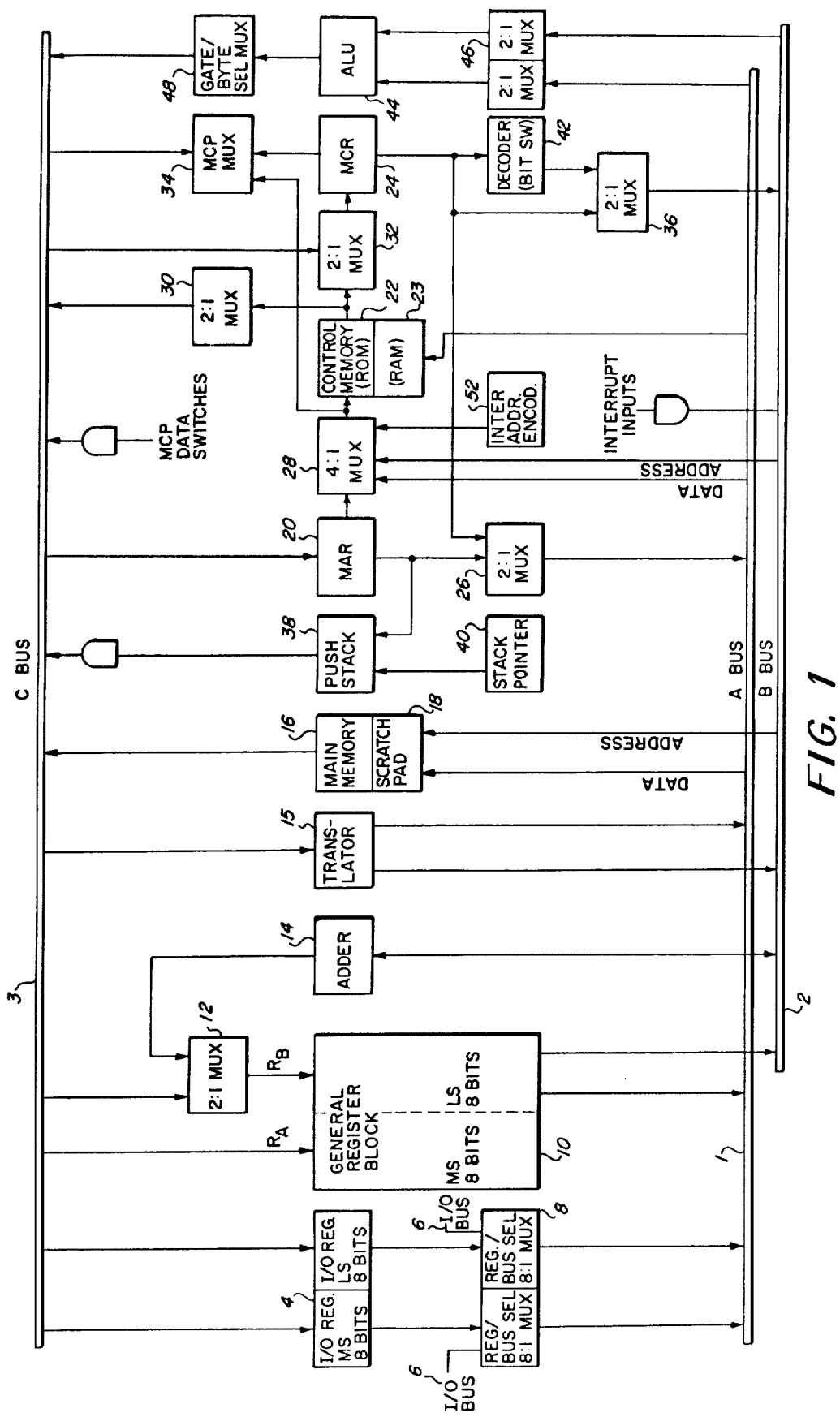
FIG. 1 is an overall block diagram of the processor of the instant invention.

FIG. 1 shows such an arrangement wherein the A bus, B bus and C bus are shown at 1, 2 and 3 respectively. Connecting the A bus 1 and the C bus 3 are a set of input/output registers 4 which are additionally connected to an input/output bus 6 by means of a register bus selection multiplexer 8. A set of general registers 10 is connected by means of their input to the C bus and by means of their output to the A and B buses. As shown in FIG. 1, the general registers may be 16 bits wide, with the most significant 8 bit appearing on the left side of the diagram and the least significant 8 bit appearing on the right side thereof. It is possible to utilize a block of 8 bit registers (using only the least significant 8 bits) by means of a two to one multiplexer 12 which would divide the C bus' 16 bits into two 8 bit segments. Likewise, although the diagram indicates only the least significant 8 bit segment connected to the A bus and B bus, with the optional most significant 8 bit register block the resulting 16 bit words may be directly placed on the A bus or B bus. Also shown associated with the general register block is an adder 14 connected between the B bus and the two to one multiplexer 12. The adder 14 allows an arithmetic operation to be performed upon data as it is being passed through the general register block from, for example, the B bus to the A bus. A translator 15 allows the storage of microinstruction sets corresponding to the macroinstruction instruction set of a computer to be emulated.

A main memory and scratch pad memory 16 and 18, respectively, are shown connected such as to receive data from the A bus and an address from the B bus. The memory output is directed to the C bus 3. The scratch pad memory 18 may be used for intermediate storage beyond the limits of the 8 general registers or for other purposes to be described later. The main memory can be used to store data, results, microinstructions awaiting transfer to a variable control memory, or microinstructions if the device is being used in an emulation mode to emulate the macroinstruction set of another data processing machine.

The microcontrol elements of the device include the micro-address register 20, the control memory 22 which may comprise a read-only memory and/or a random access memory, and the microcontrol register 24 which holds the current microinstruction while it is being executed. Also associated with the microcontrol elements are a series of multiplexers 26, 28, 30, 32, 34 and 36. The multiplexers are used primarily for translating between various address/data information bit widths. A push stack 38 and a stack pointer counter 40 also associated with the microcontrol elements and their functions will be described later. Similarly, decoder 42 will be described in conjunction with the description of the microcontrol register contents.

An arithmetic and logic unit 44 with its associated input and output multiplexers 46 and 48, respectively, is capable of performing, in a preferred embodiment, 32 arithmetic or 16 logical operations, taking its two operands from the A bus and B bus and placing the results on the C bus.

In very general terms, the operation of the machine is such that a 32 bit microinstruction is divided into a number of fields which control all the operations of the machine. For example, the microinstruction determines the source of data for the A bus and B bus, whether it is to be an input/output interface or a general register. It determines the function to be performed in the arithmetic and logic unit on data from the A bus and B bus, and it further determines that data from the A bus is to be stored in scratch pad/main memory at an address contained on the B bus. Complete definition of the microinstructions fields will be provided later in this specification.

It is apparent, from a view of FIG. 1, that the microinstructions can direct the flow of data through a variety of paths. Incoming data from the input/output bus, for example, can be routed directly to scratch pads/main memory or can be first operated on in the arithmetic and logic unit 44. Results from the ALU 44 can be transmitted immediately by an input/output register 4 to the input/output bus 6 or can instead be held in a general register 10 pending further manipulation within the machine. Similarly, information from scratch pad/main memory (18, 16) can be routed to the input/output bus 6 or to a general register 10.

The general registers 10 may be used to buffer data between the C bus 3 and the A bus 1 or B bus 2 for further processing or storage within the machine. Similarly, the ALU 44 can be used as a path to move data unchanged from the A bus 1 or B bus 2 to the C bus 3.

Thus, multiple fields enable the microinstruction to control a number of operations and address civil locations simultaneously. A tightly packed microinstruction provides parallel processing and results in efficient machine utilization. It is apparent that, although not specifically shown on FIG. 1 for purposes of clarity of description, a plurality of control paths exist from the microcontrol register 24 to each of the devices which has access to one or more of the buses.

It may also be noted that the generalized three-bus architeture of the device makes it possible to add functions as the needs arise, such as, a high-speed multiply/divide, square root, trigmetric functions, and code conversions. The addition of a translator 15, together with an emulation microprogram in the control memory permits the device to emulate a computer instruction set.

SYSTEM ORGANIZATION

Three types of information are existant within the system. The basic element of information is a 16 bit word in which the bit positions are numbered from 0 through 15 as follows:

| Byte 0 | Byte 1 |
|---|---|
| 0 1 2 3 4 5 6 7 | 0 1 2 3 4 5 6 7 |

The binary information in the system is generally expressed in hexidecimal notation because four binary digits of information can be expressed by a single hexidecimal digit. Thus, a byte can be expressed with a string of two hexidecimal digits, a word with a string of four hexidecimal digits, and a double word with a string of eight hexidecimal digits. For purposes of this disclosure, a hexidecimal number is displayed as a string of hexidecimal digits surrounded by single quotation marks and preceeded by the letter 'X'. For example, the binary number 01011010 is expressed in hexidecimal notation as X'5A'. Hexidecimal numbers are generally used to denote addresses and data values. There are instances, however, in which decimals numbers are more meaningful or are customary. Also, for purposes of this discloure, fixed-point data is expressed in two's complement notation consisting of a 15 bit interger and a sign bit in the 0 position. Logical operations assume that a logical data word format consisting of 16 bits without sign, is used.

A second class of information within the system is the micro-address. The micro-address is 12 bits, capable of addressing up to 4,096 control memory locations. The micro-address register (MAR) 20, push stack 38, and related gating operations are on a 12 bit basis when a micro-address is routed over one of the three buses 1, 2, 3, it occupies the least significant 12 positions of the 16 bit positions of each bus.

The third class of information in the system is the microinstruction, 32 bits in length. The control memory 22 and the microcontrol register (MCR) 24 both operate on a 32 bit basis. When a microinstruction is routed over one of the buses, it is handled into 16 bit sections. The flow of information within the device may be described in four categories called a micro-address, microinstructions, data, and interrupt.

The basic microinstruction format is a 32 bit format subdivided into 11 micro-operational fields (micro OP fields) as shown below. This format will be extensively discussed in a later following section of this specification.

| 0 | | | | | | | | | | 31 |
|---|---|---|---|---|---|---|---|---|---|---|
| IO Mode | RA Select | ALU Mode | RB Select | A Bus Cont. | B Bus Cont. | C Bus/ Regist. Cont. | Branch Cont. | Mult. uOP Fld. 1 | Mult. uOP Fld. 1 | Mult. uOP Fld. 3 |

Figure 2:
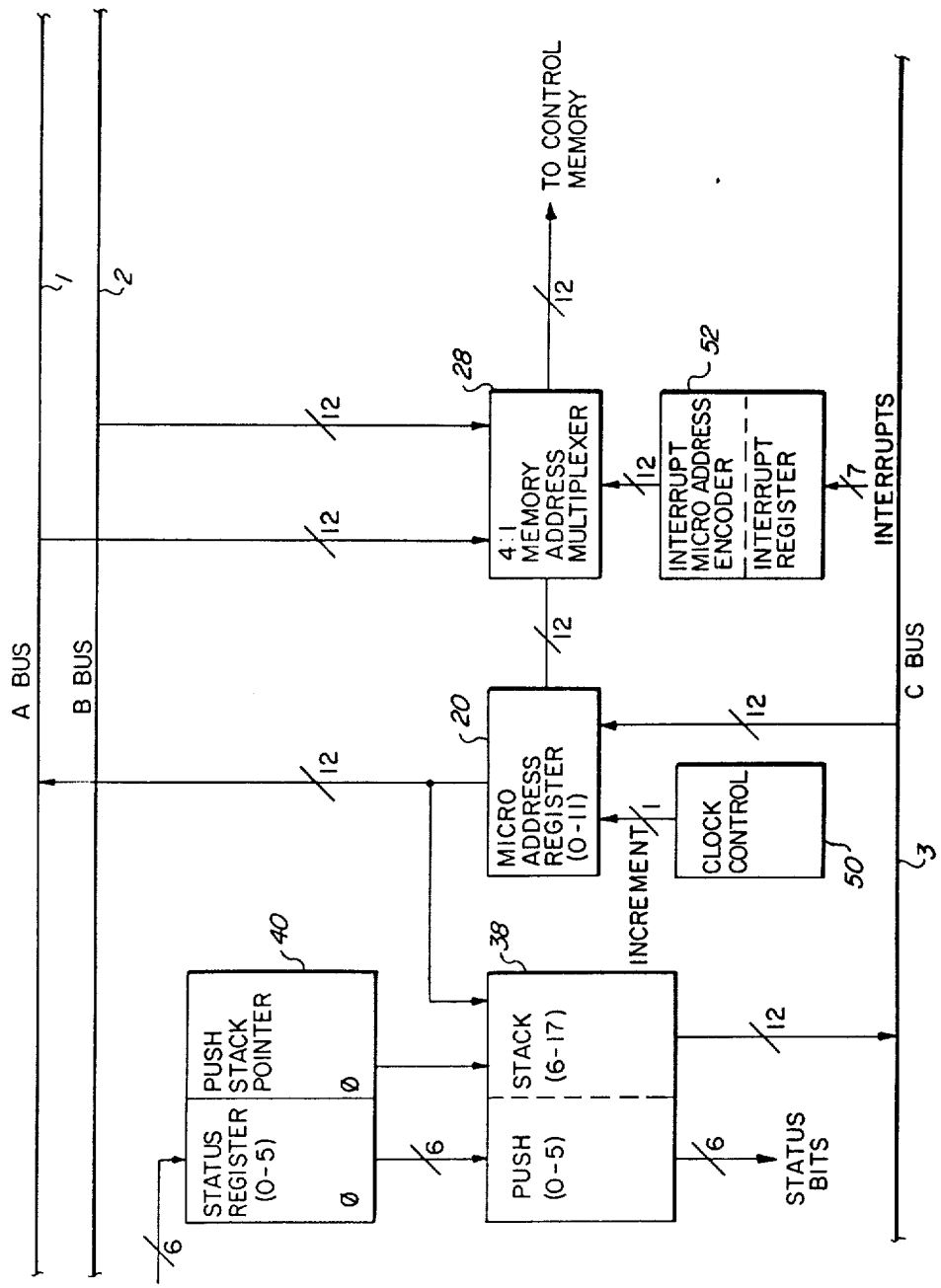
FIG. 2 is a block diagram of the Micro Address Generator portion of the processor.

The micro-address information flow is shown generally in FIG. 2. Various elemental blocks are numbered to coincide with the numbers originally given in FIG. 1. Note the addition, however, of a clock control device 50 which is shown as driving the MAR 20. Although the clock control is shown for only the one element 20, the equivalent clock function is assumed to be applied in functional relation to all blocks in which the symbol $\phi$ appears.

The micro-addresses are normally held in the MAr 20. From here they are applied at $\phi$ at the 4:1 memory address multiplexer 28 to select the control memory location in which a microinstruction is stored. The micro-address in the MAR 20 can be changed in two ways:

1. Incremented to the next micro-address by the clock.
2. Jumped to another micro-address supplied from the C bus.

It should be noted that, for the purposes of the remainder of this specification, where a slant line with a number immediately thereunder is associated with a line on any of the figures, the number indicates the number of wires connecting the associated elements. For example, between the C bus and the micro-address register 20 a 12-wire cable is the connective element.

The micro-address applied to control memory 22 can be multiplexed from 3 sources in addition to the micro-address register: A bus, B bus, and interrupt logic. The interrupt logic 52 generates micro-address corresponding to each interrupt.

When an immediate address is used and it is desired merely to increment the micro-address register 20, bits 20 through 31 from the microcontrol register 24 are used directly as the next micro-address. At the same time, this immediate address is routed via bus A through the arithmetic and logic unit (ALU) 44 with a one added thereto. The result is presented via the C bus to the input of the MAR 20. The next system clock will cause this value to be put into the MAR 20 allowing continuous simultaneous fetch/execute cycles through the system. Relative micro-addressing will be discussed in some detail later in this specification.

The current micro-address in the MAR 20 can be stored in the push-stack 38 and replaced with a micro-address from the C bus 3. Also, the micro-address from the push stack 38 can be routed by the C bus 3 to the micro-address register 20. At the same time the micro-address is stored in the push stack, 6 status bits are entered into the push stack.

INSTRUCTION FLOW

The microinstructions are stored in control memory. In the instant embodiment, two types of control memory are shown, a read only memory 22 and a random access memory 23. It is also within the scope of the invention to provide additional types of control memory such as an electrically alterable memory. In addition, a separate memory may be provided to perform such functions as diagnostics and field varification.

Figure 3:
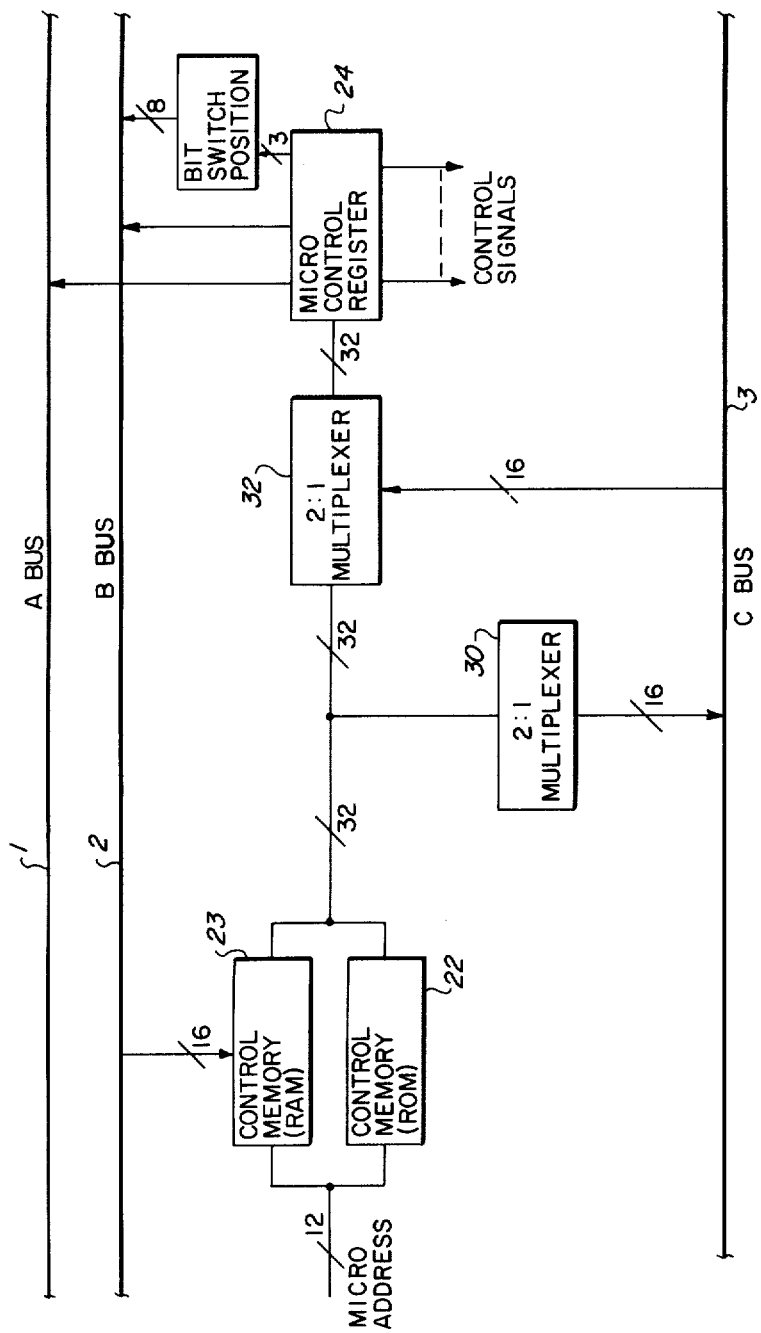
FIG. 3 is a block diagram of the Microinstruction Processing portion of the processor of the instant invention.

Micro-instruction processing is diagramed in FIG. 3. When addressed by a micro-address, a microinstruction is transferred from control memory 22 or 23 via a 2 to 1 multiplexer 32 to the microcontrol register MCR 24. A microinstruction can also reach the MCR 24 from a maintenance control panel via the C bus 3 and its associated 2 to 1 multiplexer 30 in 2 16 bit increment.

In the case of the random access type control memory 23, a new microinstruction can be written into the location addressed by the micro-address. The new microinstruction is obtained in two 16 bit increments from the A bus 1 over the 16 bit line shown in FIG. 3. A microinstruction can be read out from any type of control memory via a two to one multiplexer 30 in two 16 bit increments to the C bus 3.

From the MCR 24, the microinstruction is decoded to provide control signals that direct the flow of data through the system as well be detailed later. The last 12 bits of the microinstruction, when used as an immediate micro-address are placed on the A bus 1 by means of the 12 bit line shown in FIG. 3. Similarly, the last 8 bits of the microinstruction, when used as an Emit field (to be discussed later) are placed on the B bus 2. The 3 bits defining the bit switch/position are decoded in decoder 42 and placed on the B bus.

With respect to timing, the first microinstruction is read from the control memory 22, 23. When this microinstruction is clocked into the MCR 24, the incrementor (ALU 44) is activated causing the MAR 24 to be incremented to MAR+1.

Since there are no phases in the clock of the device, this new address is immediately presented to the control memory 22 which reads the next microinstruction to the input of the MCR 24. The next clock will save the datum result input to the MCR 22 to the new microinstruction that was waiting and increment the MAR to MAR+1. This process continues until a micro-address other than a sequential sequence is needed.

DATA FLOW

Data flows through a number of paths and registers including the arithmetic and logic unit ALU 44, general registers 10, input/output modules of various kinds 4, scratch pad 18, main memory 16, and instruction translator 15 if such a device is used to provide emulation of computer macroinstructions.

ARITHMETIC AND LOGIC UNIT (ALU)

Figure 4:
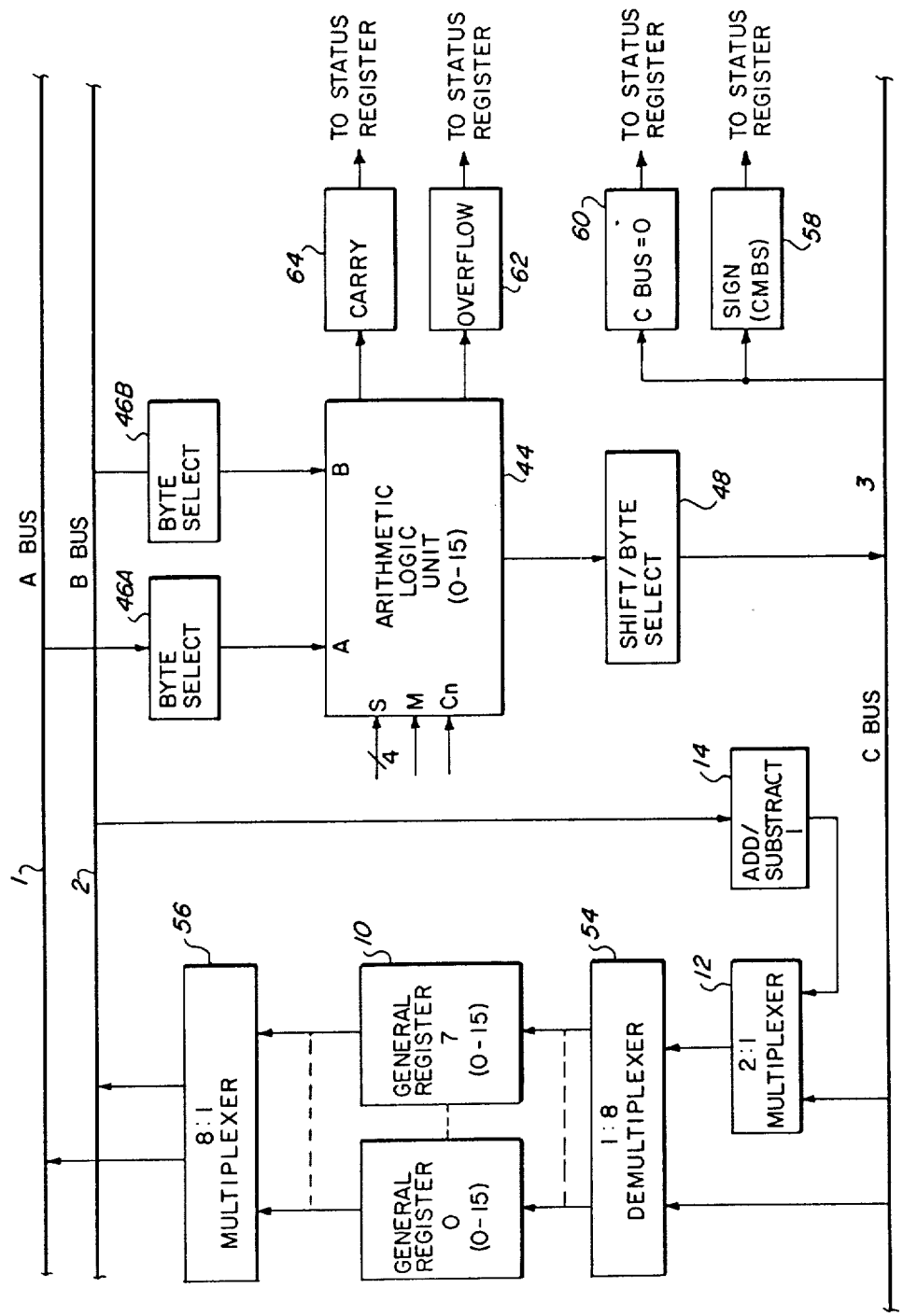
FIG. 4 is a block diagram of the Arithmetic and Logic Unit and General Register Portion of the processor.

The ALU 44 accepts a byte or word from the A bus and B bus, performs arithmetic or logic operations on the two operands and outputs the results through a rotat/byte select logic 48 to the C bus 3 as shown in FIG. 4. Operand word or byte selection, operations selection, and output shift or byte select are all specified by control signals derived from the microinstruction to be described later.

The input byte select gate 46a, 46b applies both bytes, the left byte, or right byte, from the A bus to the A operand or from the B bus to the B operand.

The arithmetic or logic operations is specified by the mode signal M (shown above as the first of the 11 microoperational fields). One of 16 arithmetical and logic operations is selected by the four select lines (shown as the second and fourth microoperational fields of the diagram.) Carry in, Cn, adds "one" the results.

The ALU result can be shifted left or right one bit or transferred direct to the C bus. Also, the right byte of the results can be placed in the left byte of the C bus.

GENERAL REGISTERS

The general registers 10 provide a source for the A bus 1 and B bus 2 and the destination for the C bus 3, as shown in FIG. 4. For example, the A and B operands for the ALU 44 can be taken from general registers 10 and the ALU results can be stored in a general register.

Additionally, one can be added to or subtracted from the value on the B bus and the result stored in one of the general registers. This function is performed by the add/subtract one function 14 connected from the B bus through the 2 to 1 multiplexer 12 through a one to eight demultiplexer and ultimately applied to the general register 10.

STATUS

Four of the 6 status bit to the ALU 44 are derived from arithmetic operations, as defined below.

Carry: In word operation, the carry-out from the most significant bit of the ALU (Bit 0) or, in byte operation, the carry-out from the most significant bit of the byte (bit 8).

Overflow: An arithmetic operation on A and B operands results in a number greater than the largest number that can be processed in the space specified (word or byte). For example, in addition, overflow occurs if the sum of two positive numbers is negative or the sum of two negative numbers is positive, using two's complement format. Similarly, in subtraction, overflow results if the subtraction of a negative number from a positive number gives a negative number or if the subtraction of a positive from a negative number gives a positive number. The overflow is indicated as a status bit in register 62.

C bus equals 0: All bits of the C bus are 0. This status bit is carried in register 60.

Sign: In word operation, the most significant bit of the word (bit 0) or, in byte operation, the most significant bit of the byte (bit 8). This status is carried in register 58.

Control Mode: A compound decoded from the microinstructions sets and resets this bit. It is used for additional control of an optional function such as a macroinstruction translator. This register is not diagramed in FIG. 4.

INPUT/OUTPUT

Input/output modules 4 may be of various types to handle various modules such as a teletype or paper tape. In general, the modules perform functions of the following types:

1. Accept incoming data and place it on the A bus.
2. Transfer outgoing data from the C bus to the output.
3. Accept multiplexed general interrupts and place their identification on the A bus.

The input/output will be extensively discussed in a later portion of this specification.

Scratch Pads/Main Memory

Referring to FIG. 1, data is written from the A bus into the scratch pad 18, main memory 16, at the location addressed by the B bus. Data is read to the C bus 3 from the scratch pad 18, main memory 16 location addressed by the B bus.

TRANSLATOR

The translator 15 enables the device to emulate a computer instruction set. This provides the means for translating a macroinstruction, taken from the C bus into a micro-address $\phi$, placed on the A bus, that accessed the first of a series of microinstructions in control memory 22 to implement the macroinstruction. Moreover, in the case of a macroinstruction containing an argument field, such as the address field used in calculating direct or indirect memory locations, the translator transfers the argument field to the B bus.

MAINTENANCE CONTROL PANEL

The maintenance control panel (not shown) provides controls and indicators that display the current status of the machine and make changes in that status. The controls permit 16 data bits to be placed on the C bus, in the microcontrol register, or (12 bits) in the microaddress register. Interrupt and status bits are displayed continuously. Register or bus contents can be displayed one at a time. The maintenance control panel will be further defined in detail in a later section.

INFORMATION FLOW: SUMMARY

Figure 5:
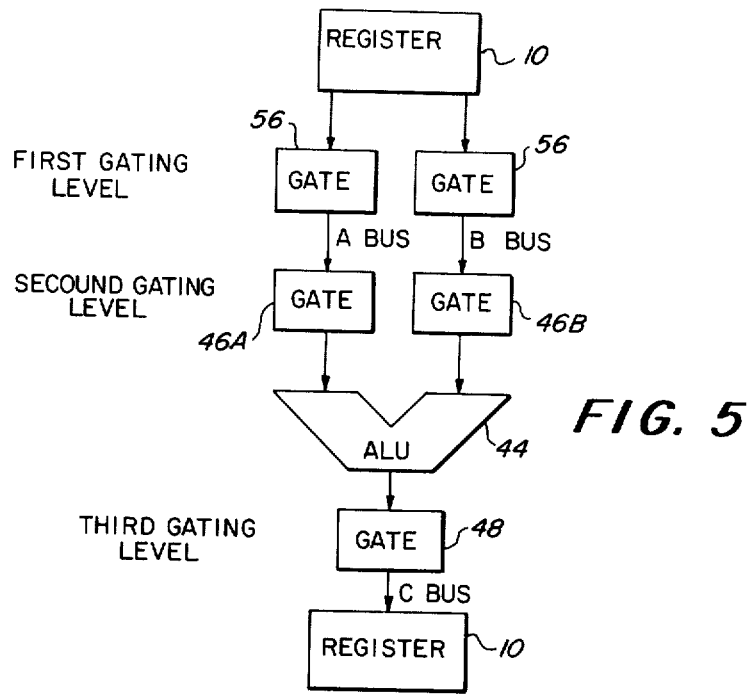
FIG. 5 is a diagram showing the information flow of the processor from a general register through a function block and back to a general register.

Information flow is the path which data takes from a general register through some function lock back to a general register. A simplified view of this flow is shown in FIG. 5.

The first level of gating (multiplexers 56) selects which register is to be gated to the source buses A and B.

The second level of gating (byte select gates 46a, 46b,) selects which byte on the A and B buses is to be presented to the ALU 44 to have some function performed.

The third level of gating (shift/byte select 48) selects whether the output of the ALU 44 is to be logically shifted left or right 1 bit position and/or if the right byte should be moved to the left byte of the C bus (destination bus).

Adding to this information flow is an alternate path that data may take instead of through the ALU function logic. This alternate path is shown in FIG. 6.

Figure 6:
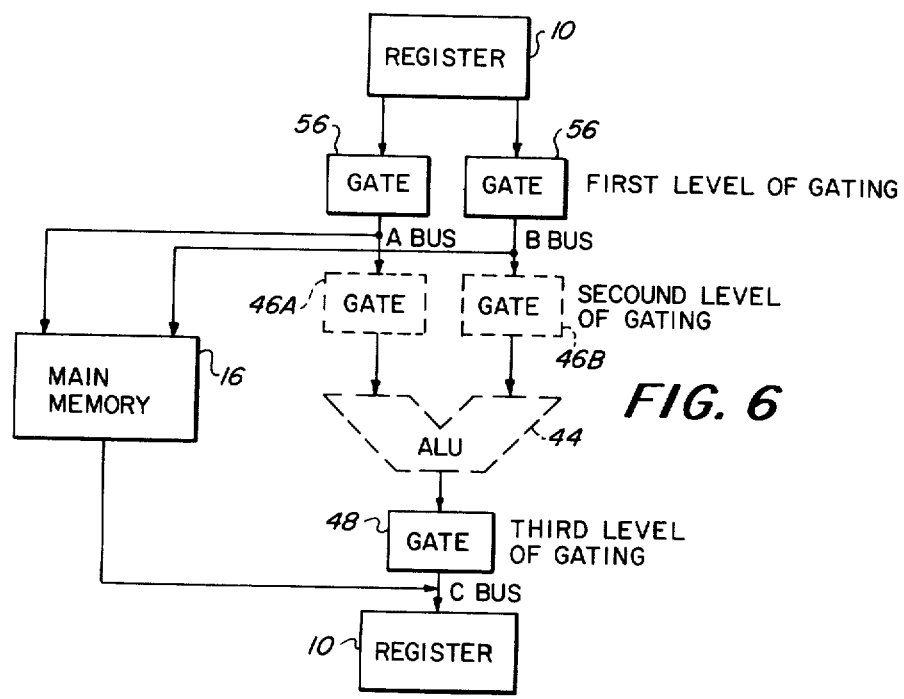
FIG. 6 is a diagram of an alternate information flow path.

In FIG. 6, the first level of gating (multiplexers 56) select which register is to be used as the data register (A and C buses) and which register is to be used as the memory address register (B bus).

The second level of gating and the third level of gating are both disabled (disconnected through the used to the tri-state logic previously discussed) so that the output of the main memory can be connected directly to the C bus (register destination bus).

Figure 7:
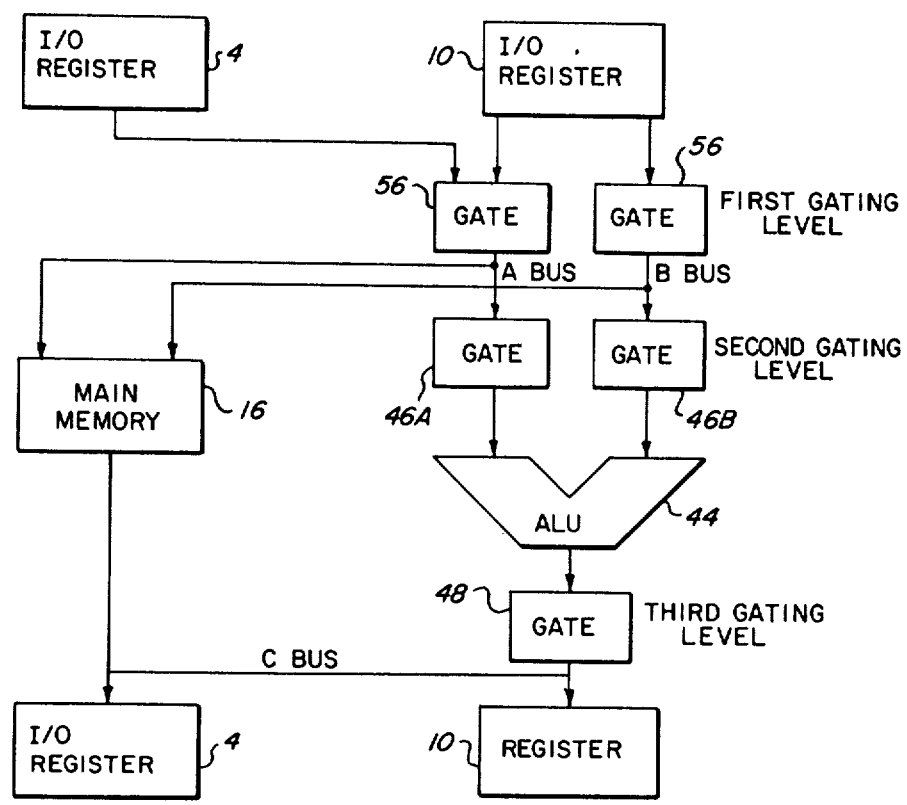
FIG. 7 is a diagram of a third information flow path wherein an IO register is a source and either an IO or general register is the destination.

The third information path allowed is shown in FIG. 7. The first level of gating for the A bus (multiplexers 56) select, instead of a general register 10 as its source, an IO register 4 to be gated onto the A bus. The first level of gating for the B bus is free to select a general register to be gated to the B bus.

The data flow can then be routed to the main memory 16 through the ALU 44 back to either the IO register 4 or general register 10 or from the main memory 16 to the IO register 4. The third level of gating 48 is used only when the ALU function is active.

INTERRUPT FLOW

Figure 8:
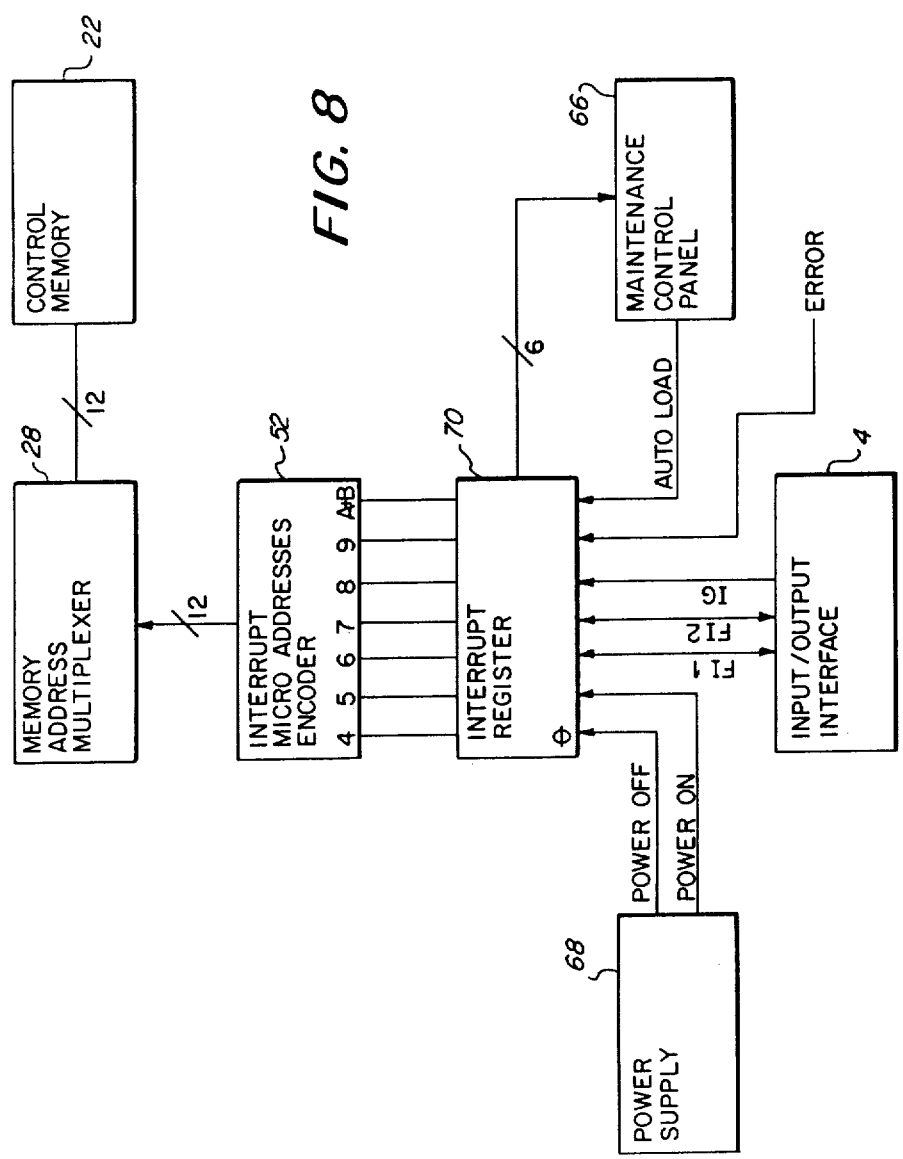
FIG. 8 is a block diagram of the Interrupt flow of the processor.

Seven interrupt lines originate in various parts of the system, as shown in FIG. 8, all of which terminate at an interrupt register 70 when one or more of the interrupt flip-flops is set, the micro-address of the interrupt that has the highest priority is applied through the interrupt micro-address and coder 52 to the memory address multiplexer 28 which then addressed the control memory 22. The interrupts are diagramed in FIG. 8 in order of priority from X '4' to X 'A'. Each microaddress points to a microinstruction specified by the system programmer initiating a procedure that responds to that interrupt.

The contents of the interrupt register may be displayed on a maintenance control panel 66.

The interrupts form the following functions:

Power Off: A logic signal from the power supply that indicates loss of input power which in a short period of time after input power has dropped. Power supply may be designed such that there is sufficient storage in the power supply such that the voltage does not go out of regulation until some period of time beyond that which the interrupt is activated.

Power On: A logic signal from the power supply that indicates the power is on.

Fast Interrupt One: A logic signal from the input/output interface 4 directly to the interrupt register and used primarily for high-speed data transfers to/from user logic via the IO interface 4 from/to scratch pad/main memory 16, 18. The interrupt register returns a hardware response to the IO interface.

Fast Interrupt Two: The same as fast interrupt one, except of lower priority. One of the fast interrupts may be used to input data while the other is used to output data. The fast interrupts will be described in details in the later section:

Input/Output: A logic signal that indicates that a multiplexed input/output interrupt is pending on one or more of the input/output interfaces. In response to the signal, the system programmer requests the highest priority I/O module 4 with an interrupt pending to put its address on the A bus.

Error: A logic signal that indicates a parity error has occured in control memory, scratch pad or main memory.

Auto Load: A switch signal from the maintenance control panel used to indicate an automatic loading routine. This signal defects a trap to control memory location as a function of whether the system is on or off. This may also be used as a console interrupt.

MICROINSTRUCTION REPERTIORE

This section describes the actions that results from each microoperations code at each field of the microinstruction.

As earlier discussed, the microinstruction consists of 32 bits, divided into a number of single purpose and multi-purpose shields. FIG. 9 shows the possible combination of fields in a single 32 microinstruction. As can be seen from the figure, up to 11 fields, may be defined in a single microinstruction. These fields are decoded the microinstruction decoder 42, (FIG. 1) to provide control signals for all other elements of the system. The microprogram is stored in control memory 22. During the execution of a particular microinstruction, that microinstruction is held in the microcontrol register MCR 24.

The configuration shown in FIG. 9 may be sumarized in the following statements:

Bus,
| | |
|---|---|
| A(0–15) | A Bus |
| A(0–7) | Left Byte, A Bus |
| A(8–15) | Right Byte, A Bus |
| B(0–15) | B Bus |
| B(0–7) | Left Byte, B Bus |
| B(8–15) | Right Byte, B Bus |
| C(0–15) | C Bus |
| C(0–7) | Left Byte, C Bus |
| C(8–15) | Right Byte, C Bus |
| IO(0–15) | Input/Output Bus |
| IO(0–7) | Left Byte, IO Bus |
| IO(8–15) | Right Byte, IO Bus |

Register,
| | |
|---|---|
| IORn(0–15) | Input/Output Register 0 – 7 |
| GRn(0–15) | General Register 0 – 7 |
| MAR(0–11) | Micro Address Register |
| MCR(0–31) | Micro Control Register |
| IR(0–6) | Interrupt Register |
| SR(0–6) | Status Register |
| PSn(0–17) | Push Stack 0 – 15 |
| T(0–15) | Translator |

Memory,
| | | |
|---|---|---|
| Control | CM-RAM(MAM) | = CM(0–1024, 0–31) |
| Memory | CM-ROM(MAM) | = CM(0–4096, 0–31) |
| | CM-EAROM(MAM) | = CM(0–4096, 0–31) |
| Field Verification, FV(MAM) | | = CM(x'FOO'-x'FFF', 0–31) |
| Scratch Pad, SP(B) | | = SP(0–1024, 0–15) |
| Main Memory, MM(B) | | = MM(0–65,536, 0–15) |
| Clock, Phi or $\Phi$ | | One-phase clock (one clock dropped for main memory accesses) |

Other Terms:
| | |
|---|---|
| ALU | Arithmetic Logic Unit |
| ALU-A | A operand inputs to ALU |
| ALU-B | B operand inputs to ALU |
| ALUM | ALU Mode |
| ARG | Argument from Translator |
| Cn | Carry-in to ALU |
| DA | Device Address |
| I | Interrupt |
| IOI | Input/Output Interrupt |
| IOM | IO Mode |
| MAM | Memory Address Multiplexer |
| MCP | Maintenance Control Panel |
| S | Status bit |
| Vn | Vector n from Translator (a micro address) |

SINGLE PURPOSE MICRO FIELDS

The specific function, taken alone, of each singlefield micro opcode is defined. Unless otherwise stated, execution of each micro instruction occupies one clock period and each microinstruction updates the status register.

Input/Output Mode: Input/output Mode (IOM) selects general registers 10 or input/output data 4.

RA Select: When IO Mode is false, RA Select is the address of a general register 10 which is to be the source of data for the A bus.

When IO mode is true, RA Select and Device Select (bits 28–31 of the microinstruction) are the address of an input/output module 4 which is to be the source of data for the A bus. (Unless specifically inhibited, this field sources a general register or input/output module to the A bus). A bus control is needed to complete the selection process.

ALU Mode: ALU Mode causes the Arithmetic Logic Unit 44 to perform arithmetic functions when false and logic functions when true. This mode is discussed further in connection with ALU Select.

RB Select: RB Select is the address of a general register 4 which is to be the source of data for the B bus. In addition, when IOM is true and B bus control is 3, the RB Select field assigns a bit to one of the eight least significant positions on the B bus, as discussed further in the section entitled Bit Switch/Position. B bus control is necessary to complete the selection process.

A Bus Control: A Bus Control is concerned with the source of data placed on the A bus, the bytes applied to the A operand inputs of the ALU 44, and the bytes read from or writted into main memory 16.

0. Contents of general register 10 or input/output module 4 data specified by IO Mode, RA Select and Device Select are placed on A bus. Both bytes of A bus are applied to A operand of ALU 44. Both bytes of A bus may be read from or written into main memory 16.
If IOM = 0 then A(0–15) ← GRn(0–15) else A(0–15) ← ION(0–15) ALU-A(0–15) ← A(0–15)
If Branch Control = $x'2'$ then C(0–15) ← MM(0–15) (B)
If Branch Control = $x'3'$ then MM(0–15) (B) ← A(-0–15)

1. Contents of general register 10 or input/output module 4 data specified by IO Mode, RA Select and Device Address are placed on A bus. The left byte of A bus is applied to the A operand of ALU, right justified. The left byte of A bus may be read from or written into the left byte of main memory 16.
If IOM=0 then A(0–15) ← GRN(0–15) else A(0–15-) ← IOn(0–15) ALU-A(8–15) ← A(0–7); ALU-A(0–7) ← 0
If Branch Control = $x'2'$ then C(0–7) ← MM(0–7) (B)
If Branch Control = $x'3'$ then MM(0–7) (B) ← A(0–7)

2. Contents of general register 10 or input/output module 4 data specified by IO Mode, RA Select, and Device/Select are placed on the A bus. The right byte of A bus is applied to the A operand of ALU, right justified. The right byte of A bus may be read from or written into the right byte of main memory 16.
IF IOM = 0 then A(0–15) ← GRn(0–15) else A(0–15-) ← IOn(0–15) ALU-A(8–15) ← A(8–15); ALU-A(0–7) ← 0
If Branch Control = $x'2'$ then C(8–15) ← MM(8–15) (B)
If Branch Control = $x'3'$ then MM(8–15) (B) ← A(-8–15)

3. Contents of Micro Address Register 20 are placed on the A bus, right justified. Both bytes of A bus are applied to the A operand of ALU 44. Transferring a register 10 to the A bus is inhibited.
A(4–15) ← MAR(0–11);
ALU-A(0–15) ← A(0–15)
A micro opcode in one of the C bus/register control micro opcodes is needed to complete A bus control. A bus control can be overridden by MCR 24 Control:
= X'3', Read Vector 1 to A Bus from Translator 15, MCR Control
= x'5', Read Vector 2 to A Bus from Translator 15, MCR Control
= x'E', Read Interrupt Address to A bus, and C Bus/Register
Control = x'B', Immediate Addressing Invoked to MAR.

B Bus Control: B bus control is concerned with the source of data placed on the B bus and the bytes applied to the B operand inputs of the ALU 44.

0. Contents of general register 10 specified by RB Select are placed on B bus; both bytes of B bus 90 to ALU 44.
B(0–15) ← GRn(0–15)
ALU-B(0–15) ← B(0–15)

1. Contents of general register 10 specified by RB Select are placed on the B bus; the left byte of B bus goes to ALU 44, right justified.
B(0–15) ← GRn(0–15) ← ALU-B(8–15) ← B(0–7)
ALU-B(0–7) ← 0

2. Contents of general register 10 specified by RB Select are placed on the B bus; the right bytes of B bus go to ALU 44, right justified.
B(0–15) ← GRn(0–15)
ALU-B(8–15) ← B(8–15)
ALU-B(0–7) ← 0

3. If IOM is false, the Emit Field is transferred to the B bus, right justified. If IOM is true, a one is transferred to the position in the right byte of the B bus defined by RB Select, as discussed further in the section entitled Bit Switch/Position. In either case, the right byte of B bus is applied to ALU 44, right justified.
If IOM = 0 then B(8–15) ← MCR (24·31) else B(8–15) ← 1(RB Sel)
In either case:
ALU-B(8–15) ← B(8–15)
ALU-B(0–7) ← 0

The B bus control can be overridden by MCR Control = x'7', Read Argument to B bus from Translator 15.

C Bus/Register Control: The C bus/register control field is concerned primarily with routing data from the C bus to the general registers 10 or input/output modules 4. This field is concerned also with shifting left or right one position the ALU 44 output to the C bus, with applying the value on the C bus to the micro-address register 20, with incrementing/decrementing the value on the B bus and returning it to a general register 10, and with using the last twelve bits of the microinstruction as an immediate address.

In the case of transfers from the C bus to the general registers 10 or input/output modules 4 defined by IO mode, RA Select, and Device Select, the bytes transferred are controlled by A bus control. In the case of transfers from the C bus to general registers 10 selected by RB Select, the bytes transferred are controlled by B bus control.

Transfers from the general registers 10 or input/output modules 4 to the A bus are not affected by the C bus/ register control = x'B' inhibits transfers to the A bus, since the A bus is being used by the immediate address. For other values of the C bus/register control field, transfers from the general registers or input/output modules to the A bus are always enabled.

Moreover, transfers from the general registers 10 to the B bus are not affected by the C bus/register control field. In other words, these transfers are always enabled, so far as this field is concerned.

C BUS/REGISTER CONTROL FUNCTION x'0' No strobe to any register. Data from the C bus is not transferred into a general register 10, input/output module 4 or any other register. However, transfers from a general register or an input/output module to the A bus and from a general register to the B bus can take place. (Transfers from a general register to the A bus can be inhibited by the C bus/register control field, but not enabled.)
C(0–15) ← ALU(0–15)

x'1'C Bus to MAR. Transfers the least significant 12 bits on the C bus to the micro-address register 20 on the clock following the micro opcode. The status register is not updated, but its contents are maintained. Then the microinstruction corresponding to the micro-address transferred into the MAR 20 is transferred into the microcontrol register 24 on the second clock following the micro opcode and is available for execution during the third clock period. Thus, execution of this micro opcode occupies two clock periods.
C(0–15) ← ALU(0–15)
MAR(0–11) ← C(4–15)·PHIn
MAM(0–11) ← MAR(0–11)
MCR(0–31) ← CM(0–31)(MAMO-11)·PHIn+1

Status Register: The foregoing micro opcode is the first one encountered in which the status register (part of the maintenance control panel 66) was not updated. As a general rule, the status register is updated by the clock concluding each microinstruction period. Under the circumstances enumerated below, however, the status register is not updated and the existing contents are maintained. In brief, it may be said that the contents of the status register are unchanged when branching or jumping to a new micro-address. In detail:

a. The C bus/register control field of the current microinstruction equals x'1' or x'9', involving C bus to MAR 20, or b. The branch control field of the current microinstruction specified a Test/Branch micro opcode or Push, or c. A fast interrupt micro instruction in control memory location x'006' or x'007' is being executed.

x'2' Use RA Select Device Select, IO Mode, and A bus control as a routing address. If A bus control = 1, the right byte of the ALU output is transferred to the left byte of the C bus; for other values of A bus control, both bytes of ALU output are transferred to the C bus. For A bus control = 0, both bytes of the C bus are transferred to a general register or input/output module selected by IO mode, RA Select, and Device/Select; for A bus control = 1, the left byte of the C bus is transferred to register 10; for A bus control = 2, the right byte of the C bus is transferred to register 10; for A bus control = 3, both bytes of the C bus to general register 10, and C(8–15) ← 0

If A bus Con = 1 then   C(0–7) ← ALU(8–15) else
                                 C(0–15) ← ALU(0–15)
A Bus Control
0       If IOM = 0 then GRn(0–15) ← C(0–15) else
                              IOn(0–15) ← C(0–15)

-continued

| 1 | If IOM = 0 then GRn(0–7) ← C(0–7) else |
| | IOn(0–7) ← C(0–7) |
| 2 | If IOM = 0 then GRn(8–15) ← C(8–15) else |
| | IOn(8–15) ← C(8–15) |
| 3 | GRn(0–15) ← C(0–15) | x'3' Use RB Select and B bus control as a routing address. If B control = 1, the right byte of ALU 44 output is transferred to the left byte of the C bus; for other values of B bus control, both bytes of ALU output are transferred to generalregister 10 addressed by RB Select; for B bus control = 1, the left byte of C bus is transferred to a general register 10; for B bus control = 2, the right byte of the C bus is transferred to a general register 10.

| If B bus Con = 1 then | C(0–7) ← ALU(8–15), |
| | C(8–15) ← O else |
| | C(0–15) ← ALU(0–15) |
| B Bus Control: | |
| 0: | GRn(0–15) ← C(0–15) |
| 1: | GRn(0–7) ← C(0–7) |
| 2: | GRn(8–15) ← C(8–15) |
| 3: | GRn(0–15) ← C(0–15) | x'4' Shift ALU output (to C bus) 1 bit to the left, and use RA Select, Device Select, IO Mode, and A bus control as the routing address. If A bus control = 1, the right byte of ALU 114 output is shifted 1 bit to the left, the least significant bit is filed with zero, and is transferred to left byte of C bus. The left byte of C bus is transferred to the left byte of general register 10 or input/output module addressed 4 by IO Mode, RA Select, and Device Select. For other values of A bus control, both bytes of ALU output are shifted one bit to the left, the least significant bit is filed with zero, and both bytes are transferred to the C bus. For A bus control − 0, both bytes of C bus are transferred to a general register 10 or input/output module 4. For A bus control = 3, both bytes of C bus are transferred to a general register.

| If A Bus Con = 1 then | C(0–6) ← ALU(9–15), |
| | C7 ← 0, |
| | C(8–14) ← ALU(9–15), |
| | C15 ← 0, |
| | else C(0–14) ← ALU(1–15), |
| | C15 ← 0 |
| A Bus Control: | |
| 0: | If IOM = 0 then GRn(0–14) ← C(0–14), |
| | GRn15 ← C15(=0) |
| | else IOn(0–14) ← C(0–14), |
| | IOn15 ← C15(=0) |
| 1: | If IOM = 0 then GRn(0–6) ← C(0–6), |
| | GRn7 ← C7(=0) |
| | else IOn(0–6) ← C(0–6), |
| | IOn7 ← C7(=0) |
| 2: | If IOM = 0 then GRn(8–14) ← C(8–14), |
| | GRn15 ← C15(=0) |
| | else IOn(8–14) ← C(8–14), |
| | IOn15 ← C15(=0) |
| 3: | GRn(0–15) ← C(0–15) | x'5' Shift ALU output (to C bus) 1 bit to the left, and use RB Select and B bus control as a routing address. If B bus control = 1, the right byte of ALU output is shifted 1 bit to the left, the least significant bit is filled with zero, and is transferred to the left byte of C bus; for other values of B bus control, both bytes of ALU output are shifted 1 bit to the left, the least significant bit is filed with zero, and both bytes are transferred to C bus. For B bus control = 0 or 3, both bytes of the C bus are transferred to the general register addressed by RB select; for B bus control = 1, the left byte of the C bus is transferred to a general register; for B bus control = 2, the right byte of the C bus is transferred to a general register.

| If B bus Con = 1 then | C(0–6) ← ALU(9–15), |
| | C7 ← 0 |
| | C(8–14) ← ALU(9–15), |
| | C15 ← 0 |
| | else C(0–14) ← ALU(1–15), |
| | C15 ← 0 |
| If B bus Con = 3 then | GRn(0–14) ← C(0–14), |
| | GRn15 ← C15(=0) |
| If B bus Con = 1 then | GRn(0–6) ← C(0–6), |
| | GRn7 ← C7(=0) |
| If B bus con = 2 then | GRn(8–14) ← C(8–14), |
| | GRn15 ← C15(=0) | x'6' Shift ALU output (to C Bus) 1 bit to the right and use RA Select, Device Select, IO Mode, and A bus control as routing address. If A bus control = 0, both bytes of ALU output are shifted 1 bit to the right, the most significant bit is filed with zero, and both bytes are transferred to C bus; both bytes of the C bus are transferred to a general register or input/output module addressed by IO Mode, RA Select, and Device Select. If A bus Control = 1, the ALU output is shifted 1 bit to the right and the right byte of output is transferred to the left byte of the C bus; the left byte of the C bus is transferred into a register. In byte operation, since the inputs to the ALU A and B operands are limited to the right byte, output bit 7 will usually be zero, but may be one if the operation performed results in a carry. For A bus control = 2, the right byte of ALU output is shifted 1 bit to the right, the most significant bit is filled with zero, and transferred to the right byte of C bus; the right byte of C bus is transferred into register. In this case, the carry to bit 7, if any, from the ALU output are shifted 1 bit to the right, the most significant bit is filed with zero, and both bytes are transferred to the C bus, and both bytes of the C bus are transferred to a general register.

| A Bus Control: | |
| 0: | C(1–15) ← ALU(0–14), CO ← 0 |
| | If IOM = 0 then GRn(0–15) ← C(0–15) else |
| | IOn(0–15) ← C(0–15) |
| 1: | If B bus Control = 0 then C(0–7) ← ALU(7–14), |
| | C(8–15) ← ALU(7–14) |
| | else C(0–7) ← ALU(7–14), |
| | C8 ← 0, |
| | C(9–15) ← ALU(8–14) |
| | If IOM = 0 then GRn(0–7) ← C(0–7) else |
| | IOn(0–7) ← C(0–7) |
| 2: | CO ← 0, C(1–7) ← ALU(0–6) ← C8 ← 0, |
| | C(9–15) ← ALU(8–14) |
| | If IOM = 0 then GRn(0–15) ← C(8–15) else |
| | IOn(8–15) ← C(8–15) |
| 3: | CO ← 0, C(1–15) ← ALU(0–14) |
| | GRn(0–15) ← C(0–15) | x'7' Shift ALU output (to C bus) one bit to the right, and use RB Select and B bus control as a routing address.

If B bus control = 0, both bytes of the ALU output are styled 1 bit to the right, the most significant bit is filed with zero, and both bytes are transferred to the C bus; both bytes of C bus are transferred to the general register addressed by RB Select.

If B bus control = 1, the ALU output is shifted 1 bit to the right and the right byte of the output is transferred to the left byte of the C bus; the left byte of the C bus is transferred into the general register addressed by RB Select. In byte operation, since the inputs to the ALU A and B operands are limited to the right byte, output bit 7 will usually be zero, but may be one if the operation performed results in a carry.

If B bus Control = 2, the right byte of the ALU output is shifted 1 bit to the right, the most significant bit is filed with zero, and the right byte is transferred to the C bus; the right byte of the C bus is transferred into the general register addressed by RB Select.

If B Bus control = 3, each byte is shifted one bit to the right, the most significant bit of each byte is filed with zero, and both bytes are transferred to the C bus; both bytes from the C bus are transferred to the general register addressed by RB Select.

If IOM = 0, bits 20–31 of the microinstruction, called the immediate address, are transferred from the microcontrol register to the A bus.

If IOM = 1, the input/output module with a multiplexed IO interrupt pending that has the highest priority location places its Device Address (consisting of the RA Select and Device Select values) on the A bus, as follows:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
|   |   |   |   |   |   |   |   | 1 |   | RA Sel |   | Device Select |   |   |   |

The input/output module provides a signal forcing bit 8 to 1, in effect, adding 128 to the Device Address. At the same time, the contents of the ALU Select field, bits 20–23 of the microinstruction are appended to the above to generate a 12 bit micro-address as follows:

| 0 | 1 | 2 | 3 | 4 | 5 | 6 | 7 | 8 | 9 | 10 | 11 | 12 | 13 | 14 | 15 |   |
|---|---|---|---|---|---|---|---|---|---|----|----|----|----|----|----|---|
| X | X | X | X | ALU Sel |   |   |   | 1 | Device Address |   |   |   |   |   |   | A Bus |

```
B Bus Control:
0:  CO ← 0, C(1-15) ← ALU(0-14)
    GRn(0-15) ← C(0-15)
1:  If A bus control = 0 or 3 then C(0-7) ← ALU(7-14)
    and C(8-15) ← ALU(7-14) else
    C(0-7) ← ALU(7-14) and C8 ← 0 and
    C(9-15) ← ALU(8-14) ← GRn(0-7) ← C(0-7)
2:  CO ← 0, C(1-7) ← ALU(0-6), ← C8   0,
    C(9-15) ← ALU(8-14) GRn(8-15) ← C(8-15)
3:  CO ← 0, C(1-7) ← ALU(0-6), C8 ← 0,
    C(9-15) ← ALU(8-14) GRn(0-15) ← C(0-15)
```

$x'8'$ Increment B bus and place result in RB Selected register. This field adds one to the bit value on the B bus and places the result in the general register addressed by RB Select. Both bytes of ALU output are transferred directly to the C bus.

GRn(0–15) ← B(0–15) plus 1
C(0–15) ← ALU(0–15)

$x'9'$ Increment B bus and place result in RB Selected general register. C bus to MAR. See $x'1'$ and $x'8'$ for detailed description. This micro opcode occupies two clock periods.

$x'A'$ Increment B bus and place result in general register addressed by RB select. Use IO Mode, RA Select, Device Select, and A bus control as a routing address.

GRn(0–15) ← B(0–15) plus 1
(Remaining operations same as $x'2'$)

$x'B'$ Immediate Address. The source of the Immediate Address placed on the A bus can be one of four:

1. If IO Mode is false, the Immediate Address field of the microinstruction.
2. If IO Mode is true, the Device Address for the highest priority input/output device controller that has a multiplexed IO interrupt pending.
3. If IO Mode is false, Branch Control is $x'1'$, and MCR Control is $x'3'$, Vector 1 micro-address from the (optional) Translator.
4. If IO Mode is false, Branch Control is $x'1'$, and MCR Control $x'5'$, Vector 2 micro-address from the (optional) Translator.

The remaining operations are common. The operations are described in detail below.

If IOM = 0, Branch Control = $x'1'$, and MCR = $x'3'$ or $x'5'$, the Translator places the Vector 1 or Vector 2 micro-addresses on the A bus.

In each case, a 12 bit micro-address is now present on the A bus. This micro-address via the memory address multiplexer 28 addresses a location in control memory during the clock period of the micro opcode. At the same time, the 12 bits are applied to the A operand inputs of the ALU 44, incremented by one, transferred direct to the C bus, and applied to the micro-address register 20 at the clock following the micro opcode. Thus, the incremented micro-address serves as the control memory address during the following clock cycle.

In the execution of this micro opcode, although the ALU select field constitutes part of the Immediate Address or expanded Device Address, the ALU 44 is forced to execute the function A plus 1 by the hardware.

```
The A bus sources are summarized as follows:
    If IOM = 0 then A(4-15) ← MCR(20-31)
              else A(9-15) ← DA
                   A8 ← 1
                   A(4-7) ← MCR(20-23)
    If IOM = 0, BRC = x'1', MCR = x'3' then
    A(4-15) ← V1(0-11)
    If IOM = 0, BRC = x'1', MCR = x'5' then
    A(4-15) ← V2(0-11)
    The remaining operations are common to all sources:
    MAM(0-11) ← A(4-15)
    ALU(0-15) ← A(4-15) plus 1
    C(0-15) ← ALU(0-15)
    MAR(0-11) ← C(4-15).PHIn
```

Both the different and common operations are executed in one clock cycle. See also the section entitled Immediate Addressing.

$x'C'$ Increment B bus and place result in general register addressed by RB Select; shift ALU output (to C bus) one bit to the left; use RA Select, Device Select, IO Mode, and A bus control as the routing address.

GRn(0–15) ← B(0–15) plus 1
(Remaining operations same as $x'4'$)

$x'D'$ Not assigned.

$x'E'$ Increment B bus and place result in general register addressed by RB Select; shift ALU output (to C bus) 1 bit to the right; use RA Select, Device Select, IO Mode, and A bus control as the routing address.

GRn(0–15) ← B(0–15) plus 1

(Remaining operations same as x'6')

x'F' Decrement B bus and place result in general register addressed by RB Select; use RA Select, Device Select, IO Mode, and A bus control as the routing address.

GRn(0–15) ← B(0–15) minus 1

(Remaining operations same as x'2')

Branch Control: The branch control field is concerned primarily with Test/Branch micro opcodes. In general, a Test/Branch micro opcode tests a condition, external or internal, and branches to an immediate address or a relative address as the next control memory location is found. Otherwise, the next microaddress in sequence is taken as the control memory location. Addressing and Branching will be later discussed.

In addition, the Branch Control field is concerned with arithmetic operations, reading or writing scratch pad/main memory, push-stack operations, and status bits.

As discussed generally in a previous paragraph entitled Status Register, certain Branch Control micro opcodes cause the status bits to be loaded into the status register. In the case of other Branch Control micro opcodes, the current status bits are not loaded, but those in the status register are retained. The effect of each Branch Control micro opcode on the status register is included in the statements of function below.

Branch Control Function:

x'0' Normal Mode Carry False. In arithmetic mode (ALU Mode = 0), the ALU performs the operations listed under Cn = 0, ALU Select. Status bits are loaded into the status register at the next clock, providing C bus/register control is not x'1' or x'9'.

C ← ALU
Cn = 0
SR ← S.PHIn (PHI = Clock)

x'1' Normal Mode Carry True. In arithmetic mode (ALU Mode =0), the ALU performs the operations listed under Cn = 1, ALU Select. Status bits are loaded into the status register at the next clock, providing C bus/ register control is not x'1' or x'9'.

C ← ALU
Cn = 1
SR ← S·PHIn x'2' Read Scratch Pad or Main Memory. The contents of the SP/MM location addressed by B bus are read out to the C Bus. Status bits are loaded into the status register at the next clock, providing C bus/register control is not x'1' or x'9'. In the case of main memory the bytes read out are specified by A bus control.

C(0–15) ← SP(0–15) (B)
SR ← S·PHIn
A Bus Control
  0: C(0–15) ← MM(0–15) (B)
  1: C(0–7) ← MM(0–7) (B)
  2: C(8–15) ← MM(8–15) (B)
  3: C(0–15) ← MM(0–15) (B)

This micro opcode requires one clock period for scratch pad and a double-length clock period for main memory.

x'3' Write Scratch Pad or Main Memory. The bits on the A bus are written into the Scratch Pad/Main Memory location addressed by the B bus. Because the C bus is not used, the values of the status bits derived from the C bus (though loaded into the status register) are indeterminate. In the case of main memory the bytes written are specified by A bus control.

SP(0–15) (B) ← A(0–15)
SR ← S·PHIn
A Bus Control
  0: MM(0–15) (B) ← A(0–15)
  1: MM(0–7) (B) ← A(0–7)
  2: MM(8–15) (B) ← A(8–15)
  3: MM(0–15) (B) ← A(0–15)

This micro opcode requires one clock period for scratch pad and a double-length clock period for main memory.

x'4' Test/Branch on External Condition Set. Addresses external line (or lines) on IO module 4 defined by RA Select and Device Select.

If the test is successfel, the least significant 12 bits of the C bus are loaded into the MAR 20 on the clock following the micro opcode. The status register is not modified. The micro instruction corresponding to the micro address transferred into the MAR 20 is transferred into the microcontrol register 24 on the second clock following the micro opcode and is available for execution during the third clock period. Execution time is two clock cycles.

If the test is unsuccessful, the micro-address register 20 increments to the next micro-address in sequence at the first clock. Under this circumstance, execution time is one clock cycle.

If EXT = 1 then MAR(0–11) ← C(4–15)·PHIn
  MCR(0–31) ← O·PHIn  MAM(0–11) ← MAR(-0–11)  MCR(0–31) ← CM(0–31)  (MAMO-11)·PHIn+1 else MAR plus 1 at PHIn Because the Device Select field is employed in addressing the extermal lines (requiring that C bus/register control be other than x'B'), the immediate address field can not be used to supply the new address.

x'5' Test/Branch on External Condition Reset. Same as x'4' except that the test state is reversed.

x'6' Push. Stores 12 bit micro-address form micro address register 20 and 6 status bits from status register in 18 bit push stack 38. The contents of the C bus are transferred to the MAR 20 to serve as the next micro address. The status register is not modified. Other operations depend upon the C bus/register control field.

If C bus/register control is x'B', the immediate address obtained from the last 12 bits of the microcontrol register 24 or the device address supplied by an input-/output module 4 requesting service provides the micro-address that addresses control memory 22. Thus, Push with Immediate Address occupies one clock period.

If C bus/register Control is not x'B', the microcontrol register 24 resets at the first clock, so that no operations are executed during the following clock period. The micro-address transferred into the MAR 20 from the C bus addresses the microinstruction transferred into the microcontrol register 24 on the second clock. This microinstruction is available for execution during the third clock period. Thus, Push without Immediate Address occupies two clock periods.

---

PS(0–11) ← MAR(0–11)
PS(12–17) ← SR(0–5)
SR unchanged
  If CB/RC = 'B' then A(4–15) ← MCR(20–31) + DA
    MAM(0–11) ← A(4–15)
    C(0–15) ← A(4–15) plus 1
    MAR(0–11) ← C(4–15)·PHIn

```
If CB/RC ≠ x'B' then  MAR(0–11) ← C(4–15)·PHIn
                      MCR(0–31) ← 0·PHIn
                      MAM(0–11) ← MAR(0–11)
                      MCR(0–31) ← CM(0–31)
                      (MAMO-11)·PHIn+1
```

Figure 10:
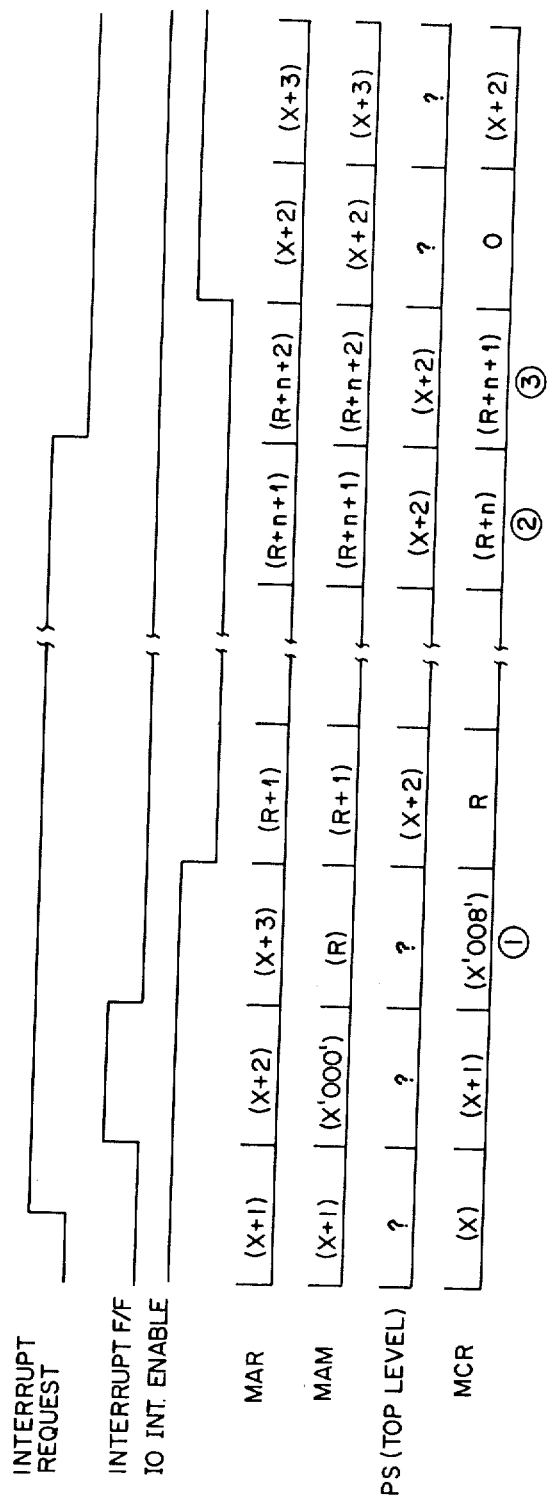
FIG. 10 is a timing diagram showing the interrupt timing of the processor.

Interrupts: The use of a Push function (and also a Pull function) in processing an interrupt is shown in FIG. 10. It is assumed that an Interrupt Request goes true during the clock cycle in which microinstruction x, for example, is being executed. The next clock sets the Interrupt flip-flop, synchronizing the Interrupt Request. The Interrupt flip-flop leads to a jump to a control memory location (in this example, x'008') in which the IO Interrupt microinstruction is stored. This microinstruction is assumed to contain Push and Immediate Address commands, the effect of which is to place micro-address R on the memory address multiplexer (shown at ① on FIG. 10.)

On the next clock, micro-address R moves to the microcontrol register and is executed. At the same time, the IO Interrupts are disabled.

The interrupt routine, R, R+1, R+2, . . . R+n, R+n+1, is next executed. The R+n microinstruction contains an IO Control micro opcode commanding the IO module to drop the Interrupt Request (②). The R+n+1 microinstruction contains a Pull Command, discussed in the next paragraph (③). At this time the Enable IO Interrupt status bit from the push stack restores the original IO Interrupt Enable status.

x'7' Pull. The micro-address from the last-used push-stack location is transferred via the C bus to the micro-address register 20 on the first clock. The status bits from the last-used push-stack location are transferred into the status register at the same time. The microinstruction corresponding to the micro-address transferred into the MAR is transferred into the microcontrol register on the second clock and is available for execution during the third clock period. The micro-address register increments to the next micro-address in sequence on the second clock. This microopcode occupies two clock periods.

```
C(4–15) ← PS(0–11)
SR(0–5) ← PS(12–17)·PHIn
MAR(0–11) ← C(4–15)·PHIn
MCR(0–31) ← 0·PHIn
MAM(0–11) ← MAR(0–11)
MCR(0–31) ← CM(0–31) (MAMO-11)·PHIn+1
MAR plus 1 at PHIn+1
``` x'8' Test/Branch Overflow = 1. Examines the state of the Overflow bit in the status register. If this test is successful, the value on the C bus is placed in the MAR 20 to serve as the micro-address. If unsuccessful, the MAR increments to the next micro-address in sequence. The value on the C bus depends upon the C bus/register control function.

C bus/register control is not x'B': If the test is successful, the least significant 12 bits of the C bus are loaded into the MAR20 on the clock following the microopcode. The status register is not modified. The microinstruction corresponding to the micro-address transferred into the MAR is transferred into the microcontrol register 24 on the second clock following the micro opcode and is available for execution during the third clock period. This procedure occupies two clock periods.

If the test is unsuccessful, the micro-address register 20 increments to the next micro-address in sequence at the first clock. Under this circumstance, the micro opcode occupies one clock period. If OV = 1 and CB/RC ≠ x'B' then

```
MAR(0–11) ← C(4–15)·PHIn
MCR(0–31) ← 0·PHIn
MAM(0–11) ← MAR(0–11)
MCR(0–31) ← CM(0–31) (MAMO-11), PHIn+1
else MAR plus 1 at PHIn
```

Test/Branch functions x'9' through x'F' follow the pattern set forth under x'8' above. Only the condition tested in different.

x'9' Test/Branch C bus = 0. Examines the state of the C bus = 0 in the status register.

x'A' Test/Branch Carry = 1. Examines the state of the Carry bit in the status register.

x'B' Test/Branch CMSB = 1. Examines the state of the most significant bit on the C bus, which is the sign bit in arithmetic operations. If the sign bit is 1 (negative), the test is successful.

x'C' Test/Branch Overflow ≠ 1. Same as x'8' except the test is reversed.

x'D' Test/Branch C bus ≠ 0. Same as x'9' except the test is reversed.

x'E' Test/Branch Carry ≠ 1. Same as x'A' except the test is reversed.

x'F' Test/Branch CMSB ≠ 1. Same as x'B' except the test is reversed.

MULTIPLE PURPOSE FIELDS

Microinstruction bits 20 – 31 are divided into three 4 bit fields which are used for multiple purposes (see FIG. 9). The particular use of each field is determined by the micro opcodes assigned to IO Mode, B bus control, C bus/register control, and branch control. In brief, there are four distinctions:

a. IO Mode distinguishes between the use of the second multi-purpose field, bits 24–27, for input/output control or other purposes.

b. B bus control distinguishes between the use of the second and third multi-purpose fields, bits 24–31, for Emit Field or other purposes.

c. C bus/register control distinguishes between the use of all three fields, bits 20–31, for Immediate Address or other purposes.

d. Branch control field distinguishes the source of the Immediate Address.

The specific function, taken alone, of each micro opcode for each purpose of the multiple-purpose fields is defined below.

ALU Select: The ALU Select field is used to select the function the ALU is to perform, as shown in FIG. 11: In addition, bits 20–23 may be used for other functions, as defined in the following section entitled MCR Control.

The only difference between the two sets of arithmetic functions listed in FIG. 11 is that an incoming carry adds a one to the result. Thus, as an example, ALU Select = x'6' generates A minus B minus 1 (one's complement subtract) with carry-in false and A minus B (two's complement subtract) with carry-in true.

Arithmetic operations may produce changes in the status bits Carry, C bus = O, C bus MSB, and Overflow. The status register is updated at the next clock following each arithmetic operation (as well as at other times) to reflect these changes. The status bits are defined briefly in a previous section but Overflow is explained more fully below.

The Overflow status bit is set whenever the result of the arithmetic functions A plus B (ALU Mode = 0, ALU Select = $x'9'$) and A minus B (ALU Mode = 0, ALU Select = $2'6'$) are too large to be contained in a 16 bit word (or 8 bit byte). Overflow can be set or reset unconditionally.

The following conditions are required to set Overflow, assuming A and B are two's complement numbers:

1. If A plus B and A positive, B POsitive, and ALU 44 output negative or A negative, B negative, and ALU 44 output positive
2. If A minus B and A positive, B negative, and ALU 44 output negative or A negative, B positive, and ALU 44 output positive The above algorithm is applied to the right byte of the A operand, B operand, and ALU output if A bus control and B bus control both specify a byte operation. Otherwise, the algorithm is applied to the entire 16 bit word. See also the section entitled Word/Byte Operation.

Overflow, once set, remains set until turned off by a microinstruction command (see MCR Control field).

MCR Control: If IO Mode = 0, B bus control is not 3 (Emit Field to B bus), and C bus/register control is not $x'B'$ (Immediate Address), bits 24–27 become the MCR Control field (see FIG. 9). This field is concerned with translator operation, enabling/disable and reading IO interrupts, write/read control memory, and enabling Other Functions.

MCR FUNCTION $x'0'$ No special function.

$x'1'$ C bus to translator. A 16 bit macroinstruction on the C bus, normally obtained from scratch pad/main memory, is transferred into the translator 15.

T ← C $x'2'$ Reset MAR. Resets micro address register to micro-address 0. The microcontrol register 20 is reset to all zeros at PHI following this micro opcode, so that a NOP is executed during the following clock period. Inhibits incrementing of the micro-address register at this PHI, so that the micro-address register continues to hold the micro-address zero during the following clock period. The microinstruction corresponding to micro-address 0 reaches the microcontrol register 20 at the second PHI following the micro opcode and is available for execution during the third clock period. Execution of this micro opcode occupies two clock periods.

MAR(0–11) ← 0
MAR unchanged at PHI$n$
MCR(0–31) ← 0·PHI$n$
MCR(0–31) ← CM(0–31(MA=0)·PHI$n$+1

$x'3'$ Read Vector 1 to A bus from translator (optional). Vector 1 (a 12 bit micro-address) is read to the A bus from translator 15.

A(4–15) ← V1(0–11)

In addition, if IOM = 0, C bus/register control = $x'B'$, and Branch Control = $x'1'$, the Immediate Address procedure becomes effective. The vector 1 micro-address, now on the A bus, via the memory address multiplexer 26 addresses a location in control memory 22. At the same time, the 12 bits are applied to the A operand inputs of the ALU, incremented by one, transferred direct to the C bus, and applied to the micro-address register 20 at the next clock. This combination of micro opcodes achieves one-clock cycle vector micro-addressing.

$x'4'$ Enable IO Interrupts. Enables IO interrupt register, permitting multiplexed input/output interrupt to be accepted and, consequently, acted upon. Following this micro opcode, the IO Interrupt register remains enabled until disabled by MCR = 6, or by the SCU hardware when an interrupt occurs, as discussed in a following section entitled System Input/Output. See also FIG. 10.

IR ← IOI $x'5'$ Read Vector 2 to A bus from translator. Vector 2 (a 12 bit micro-address) is read to the A bus from the translator 15. Refer to $x'3'$ for a description of one-clock-cycle micro addressing.

A(4–15) ← V2(0–11)

$x'6'$ Disable IO Interrupts. Disable the IO Interrupt register, inhibiting the acceptance of a multiplexed IO Interrupt and, consequently, preventing action on the interrupt. Following this micro opcode, the IO Interrupt register remains disabled until enabled by MCR = 4.

IR ←/— IOI $x'7'$ Read Argument to B bus from translator. The argement field of a macroinstruction, such as the address field used in calculating direct or indirect memory locations is read to the B bus from the translator.

B(0–15) ← ARG(0–15)

$x'8'$ Read MCP Data Entry switches to C bus

C(0–15) ← MCP(0–15)

$x'9'$ Not assigned.

$x'A'$ Other Functions. Inhibits output of ALU to C bus which enables bits 20–23 to be used to code Other Functions, as follows:

| Bits 20 – 23 | Other Functions |
| --- | --- |
| $x'8'$ | Reset Overflow Status Bit. OV = 0 |
| $x'9'$ | Set Overflow Status Bit. OV = 1 |
| $x'A'$ | Reset Control Mode Status Bit. CON = 0 |
| $x'B'$ | Set Control Mode Status Bit. CON = 1 |

$x'B'$ Not assigned $x'C'$ Write Microcontrol Memory 16 bits are transferred from A bus into the left half of the control memory 23 location addressed by bits 3–14 of the B bus when B15 is false, or into the right half when B15 is true as shown below. The microinstruction corresponding to the micro-address for the micro opcode period reaches the microcontrol register at the second clock following the micro opcode and is available for execution during the third clock period. Execution of this micro opcode occupies two clock periods.

If B15 = 0 then CM-RAM(0–15) (BO3–B14) ← A(-0–15) else CM-RAM(16–31) (BO3–B14) ← A(-0–15)

MCR(0–31) ← O·PHI$n$
MCR(0–31) ← CM(0–31) (MAMO-11)·PHI$n$+1
MAR plus 1 at PHI$n$+1

| x x x | Address | 4R |
| --- | --- | --- |
| 0 1 2 | 3 4 5 6 7 8 9 10 11 12 13 14 | 15 |

$x'D'$ Read Micro Control Memory. The left half of the microinstruction address by BO3 – B14 of B bus is transferred from the control memory to the C bus when B15 is false, or the right half when B15 is true. This microopcode occupies two clock periods.

If B15 = 0 then C(0–15) ← CM(0–15) (BO3–B14)
else C(0–15) ← CM(16–31) (BO3–B14)
MCR(0–31) ← 0·PHI$n$
MCR(0–31) ← CM(0–31) (MAMO-11)·PHI$n$+1
MAR plus 1 at PHI$n$+1

$x'$E$'$ Read IO Interrupts to A bus. The device address of the highest priority IO controller with a multiplexed IO interrupt pending is read to the A bus.

A ← DA $x'$F$'$ Not assigned.

IO Control: When IO mode is true(see FIG. 9), bits 24–27 become the IO Control field. This field is used to operate IO Modules, as will be discussed in a later section.

Device Select: When the B bus control is not 3 and the C bus/register control is not $x'$B$'$, bits 28–31 become the device select field. This field, in conjunction with RA Select, acts as a 7 bit IO device address.

Emit Field: When IO Mode is false, B bus control is 3, and C bus/register control is not $x'$B$'$, the last 8 bits of the microinstruction are transferred from the microcontrol register 24 to bits 8–15 of the B bus.

B(8–15) ← MCR(24–31)
B(0–7) ← 0

Immediate Address: When IO Mode is false and C bus/register control is $x'$B$'$, the last 12 bits of the microinstruction, called the Immediate Address, serve as the micro-address for control memory, as described under C bus/register control = $x'$B$'$.

Bit Switch/Position: When IO Mode is true and B bus control is 3, the Bit Switch is considered to be on and RB Select becomes the Bit Position assignment field. This field assigns a one-state to any one of the bit positions 8 to 15 on the B bus, as listed in FIG. 12.

Bus Usage: Some combinations of fields attempt to place data on a bus from more than one source, but the A, B, or C buses can be used by the various fields of any one microinstruction for only one purpose. That is, only one source should be assigned to any bus. If more than one source is assigned, the processor hardware applies some arbitrary priorities. FIG. 13 lists all the standard sources and five optional sources from which data can be placed on the three buses. The five optional sources are the input/output device controller/modules, instruction translator, scratch pad, main memory and maintenance control panel. For each source the microprogramming prerequisites are tabulated. For some bus sources, the programming prerequisites prevent the simultaneous programming of other sources.

WORD/BYTE OPERATION

Byte or word operation is specified by means of micro opcodes in the A bus control and B bus control fields, as previously defined and summarized for current reference in FIG. 14.

There are two aspects of byte or word operation: first, the application of a byte or word from the A bus to the A operand of the ALU 44 and from the B bus to the B operand of the ALU 44; and second, the transfer of a byte or word from the C bus to a general register 10 or input/output bus or register 4. The second aspect is effective only for the C bus/register micro opcodes listed in FIG. 14, while the first aspect depends only on A bus or B bus control.

In arithmetic mode, the status bits Carry-out, C bus Most Significant Bit, and Overflow are modified to reflect byte or word operation.

Carry: The ALU generates Carry (Byte) from ALU08 and Carry (Word) from ALU00. Carry (byte) becomes Carry if both the A bus and the B bus are in byte mode, that is both buses are applying either the left byte or the right byte, both right justified, to the ALU operands, providing C bus/register control is not $x'$B$'$, Immediate Addressing. Otherwise, Carry(Word) becomes Carry.

Specifically,

Carry = Carry(Byte) (A Bus Control = 1 + 2) (B Bus Control = 1 + 2)
(C Bus/Register Control ≠ B) (Branch Control ≠ 7)
+ Carry(Word) (Branch) Control ≠ 7) + (Push Stack) (Branch Control = 7)

CMSB: The C bus Most Significant Bit (sign bit) is derived from CO8 if A bus control is 2 and C bus/register control specifies the use of RA Select, device select, IO Mode, and A bus control as routing address or if B bus control is 2 and the C bus/register control specifies the use of RB select and B bus control as routing address, as shown by the underlining in FIG. 14.

Specifically,

CMSB = CO8 (Branch Control ≠ 7) [(A Bus Control = 2) (C Bus/Register Control = 2,4,6,A,C,E,F) + (B Bus Control = 2) (C Bus/Register Control = 3,5,7)] + C00(Branch Control ≠ 7). N [(a Bus Control = 2) (C Bus/Register Control = 2,4,6,A,C,E,F) + (B Bus Control = 2) (C Bus/Register)
Control = 3,5,7) + (Push Stack) (Branch Control = 7)

Overflow: Overflow is generated on a byte basis when both the A operand and the B operand and of the ALU 44 are on a byte basis. On the contrary, Overflow is generated on a word basis if either the A operand or the B operand is on a word basis. Overflow is discussed further under ALU Select.

SET/RESET/TEST A BIT

The Bit Switch/ and the Position field can be used to set, reset, or test one bit of a data function. These purposes are accomplished by comparing the data on the A bus with a known bit on the B bus. These comparisons are performed by the ALU 44 in an appropriate select function. The known bit on the B bus is supplied by the bit position field. The procedure is as follows:

1. Insert data function on the A bus. Since the bit position field assigns bits only to positions B08–B15, the portion of the A bus function that is to be compared must be routed to positions A08–A15 at the A operand of the ALU. This routing is accomplished by the use of A bus control, as shown in FIG. 14.

2. Insert desired bit-position mask on B bus, using the Bit Position Field.

3. With ALU Mode true (logic operation), use ALU Select:

To set a bit: ALU Select = $x'$E$'$(A + B)
For example: A Bus = 0100 0001
B Bus = 0000 1000

-continued

```
                C    A + B = 0100 1001
To reset a bit: ALU Select = x'7' (A.NB)
                     A Bus = 0100 1001
                     B Bus = 0000 1000
                C    A.NB = 0100 0001
To test a bit:  ALU Select = x'B' (A.B)
                     A Bus = 0000 0001
                     B Bus = 0000 1000
                C    A.B = 0000 0000
```

In this case, Test/Branch if C bus = 0 is used as the next microinstruction. Then, if C bus = 0, the bit on the A bus that is tested is 0. On the other hand, if C bus is not equal to 0, then the bit tested is 1.

ADDRESSING AND BRANCHING

There are three forms of addressing: sequential (increment micro-address register), immediate addressing, and relative addressing, and two types of branching: unconditional and conditional.

Sequential Addressing: The micro-address register 20 increments to the next micro-address, in the absence of the following:

a. C Bus/Register Control = $x'1'$ or $x'9'$ (C Bus Data to MAR) or $x'B'$ (Immediate or Device Addressing), and
b. Branch Control = $x'4'$ or $x'5'$ or $x'8'$ through $x'F'$ (Test/Branch functions), or $x'6'$ (Push), or $x'7'$ (Pull), and
c. Certain function switches pushed on the maintenance control panel 66.

Immediate Addressing: If IOM = 0 and C bus/register control = $x'B'$, the immediate address field from the last 12 bits of the microinstruction supplies the next micro-address. If IOM = 1 and C bus/register control = $x'B'$, the Device Address plu 128 of the highest priority device controller with a multiplexed IO interrupt pending supplies the next micro-address. If IOM = 1, C Bus/register control = $x'B'$, Branch Control = $x'1'$, and MCR Control = $x'3'$ or $x'5'$, the Translator 15 places the Vector 1 or 2 micro-address on the A bus.

Unconditional immediate addressing is implemented by the foregoing fields plus; in the case of immediate or device addressing, Branch Control = $x'0'$, Normal Mode Carry False. Under these circumstances the actions listed in detail under C bus/register control = $x'B'$ are carried out.

Conditional immediate or device addressing is implemented by C bus/register control = $x'B'$ and Branch Control = $x'8'$ through $x'F'$, the status bit Test/Branch micro opcodes. If the result of the test specified by the Branch Control field is true, the immediate address or the device address are passed by the memory address multiplexer 26 to address a location in control memory 22 and, incremented by one, are entered, via the C bus, into the micro address register 20 to be available as the micro-address for the next clock period. If the test result is false, the memory address multiplexer passes a micro-address from the micro-address register during the current clock period and the micro-address register increments for the next clock period.

```
If IOM = 0 then  MAM(0-11)    ← A(4-15)
                 C(0-15)      ← A(4-15) plus 1
                 MAR(0-11)    ← C(4-15).PHIn
            else MAM90-11)    ← MAR(0-11)
                 MAR plus 1 at PHIn
```

Immediate or device address micro opcodes require one clock period.

Relative Addressing: Relative addressing performs an arithmetic operation on the current micro-address, taken from the micro-address register 20, and the value on the B bus. The value on the B bus can be supplied by the Emit Field of the microinstruction, by a general register 10, or any other B bus source.

Relative addressing may be unconditional or conditional.

Unconditional relative addressing may be implemented by use of the fields shown on the first line of FIG. 15 (assuming that the B bus value is being obtained from the Emit Field). A bus control = 3 puts the contents of the micro-address register 20 on the A bus. B bus control = 3 puts the Emit Field on the B bus. (The 8 bit Emit Field can have any value up to 255.) ALU Mode = 0 and ALU Select = $x'9'$ or $x'6'$ adds or subtracts the A bus and the B bus and puts the result on the C bus. C bus/register control = $x'1'$ enters the result into the micro-address register 20 at the first clock. The microinstruction corresponding to the micro-address transferred into the MAR is transferred into the microcontrol register 24 on the second clock and is available for execution during the third clock period. Unconditional relative addressing requires two clock periods.

A(4-15) ← MAR(0-11)
ALU-A(4-15) ← A(4-15)
B(8-15) ← A(4-15)
ALU-B(8-15) ← B(8-15)
If ALU Sel = $x'9'$ then C(4-15) ← ALU-A(4-15) plus ALU-B(8-15)
If ALU Sel = $x'6'$ then C(4-15) ← ALU-A(4-15) minus ALU-B(8-15)
MAR (0-11) ← C(4-15)· PHIn
MCR (0-31) ← 0· PHI
MAM(0-11) ← MAR(0-11)
MCR(0-31) ← CM(0-31)(MAMO-11)·PHIn+1

Conditional relative addressing may be implemented as shown on the second line of FIG. 15. Cn is forced to 0 by the hardware; consequently, only the Cn = 0 column of ALU Select is usable. If the test is successful, the operations are the same as for unconditional relative addressing. If the test is unsuccessful, the micro-address register increments at the first clock. Thus, if the test is successful, conditional relative addressingoccupies two clock periods; if unsuccessful, one clock period.

SAMPLE MICRO PROGRAM

The microprogram listed below assumes a three-part table in main memory, beginning at location (decimal) 1000. The first part of the table contains 66 data values. The second part contains the lower limits and the third part, the upper limits. The purpose of the microprogram is to compare a data value with the lower and upper limits.

| 1. | 1872 | OAO3 | Load GR1 with location of data |
| 2. | 18B2 | OAE8 | Complete loading GR1 with location of data |
| 3. | 1433 | 0942 | Set limit for loop test |
| 4. | 2902 | 2FOO | Data from table |
| 5. | 1032 | 0942 | Set Pointer to lower limit table |
| 6. | 3902 | 2FOO | Lower limit from table |
| 7. | 2300 | 1600 | Is data greater than lower limit? |
| 8. | OOOB | FODO | Yes |
| 9. | 1032 | 0942 | Set pointer to upper limit table |
| 10. | 390A | 2FOO | Upper limit from table and increment |

-continued

| | | | |
|---|---|---|---|
| 11. | 3200 | 1600 | pointer<br>Is data less than upper limit? |
| 12. | 000B | F0D4 | Yes |
| 13. | 1032 | 1684 | Reset pointer to data table |
| 14. | 1400 | 1600 | Is loop complete? |
| 15. | 000B | B0CB | Sample complete (Program would continue) |

The effects of each field of the first microinstruction are detailed below.

| Field Value | Action |
|---|---|
| 1 | IOM = 0; RA Select - GR1 |
| 8 | ALUM = 1; BB Select - GR0 |
| 7 | A bus control = 1<br>A ← GR1/ ALU-A(8–15)← A(0–7)<br>B bus control = 3<br>B(8–15)← MCR(24–31)<br>ALU-B(8–15) ← B(8–15) |
| 2 | C bus/register control = 2<br>C(0–7) ← ALU(8–15), C(8–15)   0<br>GR1(0–7) ← C(0–7).PHIn |
| 0 | Branch Control = 0<br>C ← ALU, cn = 0<br>SR ← S.PHIn |
| A | ALUSEL = x'A'<br>C ← B |
| 0 | Emit |
| 3 | Emit |

In summary, this microinstruction accomplishes the following:
 a. Transfers 8 bit Emit Field to B bus (right justified). (The Emit Field to B bus micro opcode overrides the General Register to B bus micro opcode.)
 b. Transfers contents of B bus through ALU to C bus (left justified).
 c. Stores 8 bit C bus value (left justified) in left half of General Register 1.

The second microinstruction, 18B2 0AE8, is similar, except that it stores the contents of the Emit Field in the right half of General Register 1. At the completion of this microinstruction, there is stored in General Register 1 the hexadecimal number 03E8, equivalent to decimal 1000, the number specified to be the initial location of the table in main memory.

The third microinstruction, 1433 0942, transfers hex 03E8 to the A bus hex 42 from the Emit Field to the B bus, adds them together in the ALU, and puts the results, hex 042A, in general register 4 via the C bus.

The fourth microinstruction, 2902 2F00, puts the contents of general register 1, hex 03E8, on the B bus and uses this number to address main memory. The contents of this memory location are placed on the C bus and transferred into general register 2. (When main memory is enabled, the output of the ALU to the C bus is inhibited.)

The fifth microinstruction, 1032 0942, transfers the 8 bit Emit Field, hex 42, from the microcontrol register via the B bus to the B operand input of the ALU. It applies hex 03E8 from general 1 via the A bus to the A operand. The ALU adds these two numbers and outputs the sum hex, 042A, to the C bus. From the C bus this number is stored in general register 1.

The sixth microinstruction, 3902 2F00, puts the contents of general register 1, hex 042A, on the B bus and uses this number to address main memory. This location contains the first lower limit. This lower limit is placed on the C bus and transferred into general register 3.

The seventh microinstruction 2300 1600, puts the contents of general register 2 (the first data) on the A bus and the contents of general register 3 (the first lower limit) on the B bus. The ALU is set to subtract the lower limit from the data and place the result on the C bus. The C bus data is not strobed to any destination. On the same instruction the C bus most significant bit is stored in the status register.

The eighth microinstruction, 000B FOD0, examines the most significant bit of the C bus from the previous microinstruction, now stored in the status register. If the bit is 0 (positive), indicating that the first data value is greater than the lower limit, the next micro-address hex, 0D0, is taken from the immediate address field of the microinstruction via the A bus and the memory address multiplexer. At the same time, the contents of the immediate address field are supplied to the ALU, incremented by one, and transferred via the C bus to the micro-address register at the next clock. This incremented micro-address then serves as the control memory address during the next clock period. On the other hand, if the C bus Most Significant Bit is 1 (negative), the micro-address in the micro address register is incremented. This next microinstruction is the one that deals with a data value less than the lower limit. This micro opcode provides an example of conditional immediate addressing.

The remaining microinstructions of this microprogram perform similar functions.

SYSTEM INPUT/OUTPUT

In general, the input/output modules 4 in FIG. 1 engage the C bus 3 directly and the A and B buses 1 and 2 through 8 to 1 multiplexers 8.

Under the direction of control signals derived from the control memory 22 or the microcontrol register 24, an input/output module may
 a. Transfer data, status, and interrupt information from an external interface 6 to the A bus;
 b. Transfer data and control information from the C bus to the external interface 6;
 c. Transfer data from the external interface 6 to the B bus to provide a direct memory address when using a fast interrupt capability;
 d. Sense the state of one or more external conditions.

The input/output system permits users to connect input/output functions directly into the bus structure of the data processor. Each of a large number of IO module connector locations is wired identically, except for priority determination. Each location can be used for data transfers in either a multiplexed fashion or in a faster Direct-To-Memory fashion. In the multiplexed arrangement, multiple IO devices share a common IO interrupt.

Data Paths: A typical IO interface (controller) module 4 interface to the A bus 1 in order to move data, status, and interrupt identification information to the processor. It interfaces to the C bus 3 in order to move data and control information from the processor and it interfaces to interrupt control logic in the processor. It additionally interfaces to the B bus 2 to provide a direct memory address when the interface (controller) uses the fast interrupt capability.

The basic processor is able to move data on the A, B, and C busses in either 16 bit words or 8 bit bytes. This capability allows interface to byte-oriented I/O devices.

It also permits the 16 bit interfaces to be split between data and status information or data and control information.

Interrupts: Two types of IO interrupts are available in the processor: multiplexed and fast.

The multiplexed IO interrupt is available to every IO interface (controller) module and may be requested at any time by a module. In response to this interrupt, the processor accesses a fixed location in control memory which links it with an interrupt handler routine. The interrupt handler then requests the address of the highest priority device which has an interrupt pending. This address is gated to the A bus 1 by the highest priority device. The interrupt handler can then use the device address as an indirect address to the handler for the particular IO controller.

The fast interrupt accesses a fixed location in control memory 22 which contains a single instruction. This instruction typically moves data between the IO controller and bulk data storage memory 16, 18. The processor has two fast interrupts. One can be used, for instance, for moving data into the processor and the other, for moving data out.

Micro Instruction: The use of the microinstruction fields has been described in a previous section and in FIG. 9 but it is useful at this point to review the fields used to control input/output functions.

When IO Mode is 1, the RA Select and Device Select fields make up a 7 bit address field capable of selecting up to 128 IO device controllers. RA Select and Device Select also select one of 128 external condition signals to be tested when one of the Branch Control functions, Test/Branch on External Condition Set or Reset, is employed. This test is independent of IO Mode.

A Bus Control = 0+1+2 causes data from the IO device controller addressed by IO Mode, RA Select, and Device Select to be placed on the A bus (unless C bus/Register Control is $x'B'$ or MCR Control is $x'3'$ or $x'5'$).

A Bus Control also provides byte-selection control for data written to an IO device controller from the C bus, provided that C bus/Register Control specified a function that includes the use of IO Mode, RA Select, and Device Select to define the destination, as discussed below.

| A Bus Control | Definition |
|---|---|
| 0 | Full 16-bit word to destination |
| 1 | To left byte of destination |
| 2 | To right byte of destination |
| 3 | No transfer |

C bus/Rigerster control specifies the destination of data on the C bus, as well as control over data-byte routing between the ALU 44 and the C bus and right and left shifting of data transferred from the ALU 44 to the C bus. This paragraph is concerned only with destination specification. The table below defines the destination for each decoded value of the C bus/Register Control field:

| C Bus/Register Control | Destination |
|---|---|
| 0,8 | None |
| 1,9,B | MAR 20 |
| 2,4,6,A,C,E,F | IO Mode, RA Select, and Device Select define |
| 3,5,7 | RB Select defines |
| D | Not assigned |

In addition, C bus/Register Control = $x'B'$ has some other results significant to input/output operations. First, it overrides A bus Control. Second, if IO Mode = 0, the contents of the Immediate Address field are gated to the A bus. But, if IO Mode = 1, the Device Address (consisting of the RA Select and Device Select values) for the high priority input/output device controller having a multiplexed IO interrupt pending is placed on the right byte of the A bus, while the contents of the ALU Select field are placed in bits 4–7, yielding the following format:

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| x | x | x | x | ALU | Sel | | | 1 | RA | Sel | | DS | | | A Bus |

MCR Control = $x'E'$ is significant to input/output operations. This micro command causes the highest priority device controller with a multiplexed IO interrupt pending to place its device address, as defined in the preceding paragraph, on the A bus.

When IO Mode is 1 and C bus/Register Control is not $x'B'$, bits 24–27 become the Input/Output Control field. This field is not defined by the processor. It may be used by each unique device controller as a device command field. It should be recognized by a particular device controller only when IO Mode is one and RA Select and Device Select contain the address of the controller. Thus, each device controller may interpret this field in any way the input/output module designer chooses.

Interface Signals and Requirements: The SCU operates synchronously on a single-phase clock with the exception of main memory 16, 18 accesses which require a double-length clock period. Thus, everything within the unit happens within one or two clock times, simplifying interface timing.

The following table contains the signal names and functions of the interface signals. A brief description of the function of each signal follows:

AO0 – A15: A Bus. Used by IO interface modules to transfer data, status, and interrupt identification to the processor.

BO0 – B15: B Bus. Used by IO interface modules which use the fast interrupts to provide a main memory address to the SCU.

CO0 – C15: C Bus. Used by the processor to transfer data and control information to IO interface modules. This bus is never driven by IO interface modules.

IOM: Input/Output Mode. Used by all IO modules in qualifying data, control, and status transfer to/from the processor. The exception to this rule is in the generation of the NEXT signal, used during Test/Branch on External Condition micro opcodes. NEXT will be described in a following section.

RSA01–RSA03; A Register Select; EMIT28 – EMIT31: Device Select. Used to address the input/output module to be activated by the processor.

These seven signals are applied to each IO module location. Note that IOM must be used along with the Device Address compare to select an IO module.

BYTESEL-L, BYTESEL-R: Byte Select, Left or Right. Used to control the transfer of the left byte or the right byte from the C bus to the output buffer register on an IO module. When the microinstruction specifies word operation, both BYTESEL signals are true.

BCA08, BCA09; A Bus Control. May be used with Device Address decode to address a signal byte of data.

EMIT24 - EMIT27: When IO Mode is 1 and C Bus/-Register Control is not $x'B'$, EMIT24–EMIT27 become the Input/Output Control field. These four signals are available to create special micro commands for the interface modules.

AXDASTROBE: Strobe for Device Address transfer to the A bus. Gates Device Address of the highest priority input/output interface having a multiplexed input/output interrupt pending to the A bus.

NAXIOCONT: A Bus Transfer from IO Control. When low, inhibits input/output module from inserting any data onto the A bus.

CLOCK: This signal runs continuously, as diagrammed in FIG. 16, with a period of 350 nanoseconds and a pulse width (low) between 50 and 80 nanoseconds.

Figure 16:
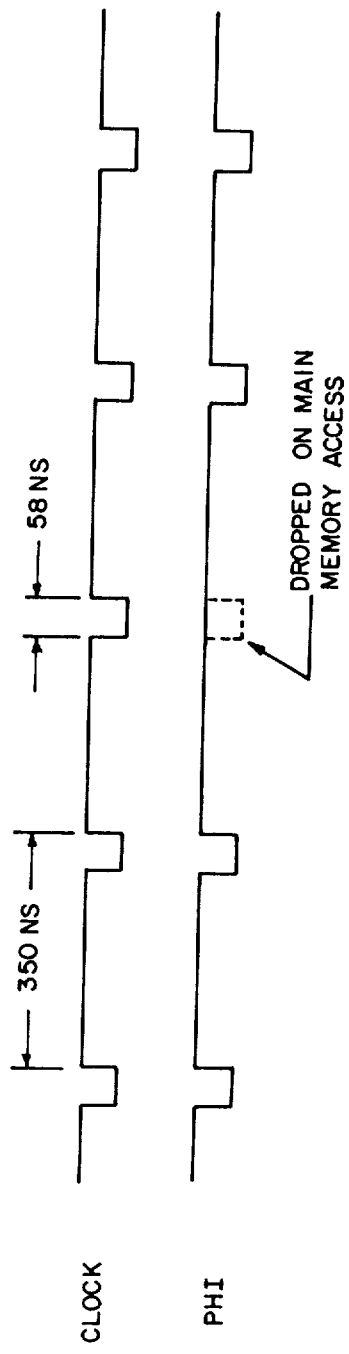
FIG. 16 is a Timing diagram of the basic single phase clock and system clock.

PHI: PHI is the system clock. All clocking within the processor is done on the rising edge of PHI. Timing characteristics are shown in FIG. 16. The period is 350 ns, except when a main memory access is in process when it is 700 ns.

NIMHERE: Must be driven low by each IO module when IO Mode = 1 and RSA01–RSA03 and EMIT28–31 contain the module's device address.

NFIRQ1, NFIRQ2: Fast Interrupt Request 1 and 2. Driven low to request that a fast interrupt be generated.

FI-1, FI-2: Fast Interrupt response. Generated by the processor in response to the corresponding Fast Interrupt Request. The highest priority device with a fast interrupt pending may use this signal to remove its request signal.

FI1PRI$n$, FI2PRI$n$, FI1PRI$n$+1, FI2PRI$n$+1: Fast Interrupt Priority strings. These functions will be later described.

NIOINT: Multiplexed general Input/Output Interrupt request line. Driven low to request an interrupt.

NINTLOCK: Interrupt Lock. Signal generated by the processor to freeze interrupt requests. No new requests can be initiated while NINTLOCK is low. It also allows the multiplexed IO interrupt priority string to settle before a device address is read to the A bus by the processor.

PRI$n$, PRI$n$+1: Multiplexer general 10 interrupt Priority string. PRI$n$ is the Priority input line; PRI$n$+1 is the Priority output line.

NEXT: External condition common line. When IO module recognizes its device address on RSA01 – RSA03 and EMIT28–31, regardless of the state of IOM, it should gate its external condition line or lines, if any, into NEXT.

NINHB: Inhibit B. INHB inhibits the general register selected by RB Select from being gated to the B bus.

| SIGNAL | INTERFACE SIGNALS FUNCTION | |
|---|---|---|
| A00 | A Bus Bit | 00 |
| A01 | | 01 |
| A02 | | 02 |
| A03 | | 03 |
| A04 | | 04 |
| A05 | | 05 |
| A06 | | 06 |
| A07 | | 07 |
| A08 | | 08 |
| A09 | | 09 |
| A10 | | 10 |
| A11 | | 11 |
| A12 | | 12 |
| A13 | | 13 |
| A14 | | 14 |
| A15 | A Bus Bit | 15 |
| B00 | B Bus Bit | 00 |
| B01 | | 01 |
| B02 | | 02 |
| B03 | | 03 |
| B04 | | 04 |
| B05 | | 05 |
| B06 | | 06 |
| B07 | | 07 |
| B08 | | 08 |
| B09 | | 09 |
| B10 | | 10 |
| B11 | | 11 |
| B12 | | 12 |
| B13 | | 13 |
| B14 | | 14 |
| B15 | B Bus Bit | 15 |
| C00 | C Bus Bit | 00 |
| C01 | | 01 |
| C02 | | 02 |
| C03 | | 03 |
| C04 | | 04 |
| C05 | | 05 |
| C06 | | 06 |
| C07 | | 07 |
| C08 | | 08 |
| C09 | | 09 |
| C10 | | 10 |
| C11 | | 11 |
| C12 | | 12 |
| C13 | | 13 |
| C14 | | 14 |
| C15 | C Bus Bit | 15 |
| IOM | I/O Mode | |
| NRSA01 | A Register Select Field Bit 01, inverted | |
| NRSA02 | A Register Select Field Bit 02, inverted | |
| NRSA03 | A Register Select Field bit 03, inverted | |
| NEMIT28 | Device Select Field Bit 28, inverted | |
| NEMIT29 | Device Select Field Bit 29, inverted | |
| NEMIT30 | Device Select Field Bit 30, inverted | |
| NEMIT31 | Device Select Field Bit 31, inverted | |
| EMIT24 | I/O Control Field Set 24 | |
| EMIT25 | I/O Control Field Set 25 | |
| EMIT26 | I/O Control Field Set 26 | |
| EMIT27 | I/O Control Field Set 27 | |
| BYTESEL-R(A) | Byte Select (Right) | |
| BYTESEL-L(A) | Byte Select (Left) | |
| NINHB | B Bus Override Control Signal | |
| BCA08 | A Bus Control Field (MSB) | |
| BCA09 | A Bus Control Field (LSB) | |
| NIOINT | Multiplexed I/O Interrupt Request | |
| PRI$n$ | Priority String Input (Multiplexed I/O Interrupt) | |
| PRI$n$+1 | Priority String Output (Multiplexed I/O Interrupt) | |
| NINTLOCK | Multiplexed I/O Interrupt Request Inhibit Signal | |
| NAXDASTROBE | Device Address to A Bus Strobe Signal | |
| NFIRQ1 | Fast Interrupt No. 1 Request | |
| NFIRQ2 | Fast Interrupt No. 2 Request | |
| FI-1 | Fast Interrupt No.1 Response | |
| FI-2 | Fast Interrupt No.2 Response | |
| NEXT | External Condition Line | |
| NRESET | Power On and MCP Reset | |
| PHI | System Clock | |
| CLOCK | Free Running 350ns Clock | |
| RTCC | 60HZ Clock | |
| ZP15 Volts | +15 Volts | |
| ZN15 Volts | −15 Volts | |
| FI1PRI$n$ | Fast Interrupt Priority Input | |
| FI2PRI$n$ | Fast Interrupt Priority Input | |
| FI1PRI$n$+1 | Fast Interrupt Priority Output | |
| FI2PRI$n$+1 | Fast Interrupt Priority Output | |

| Bits 24–27 | MCR Control |
|---|---|
| | (IOM = 0; B Bus Control 3; |
| | C Bus/Register Control x'B') |
| 0 | No special functions |
| 1 | C Bus to Translator |
| 2 | Reset MAR |
| 3 | Read Vector 1 to A Bus from Translator |
| 4 | Enable IO Interrupts |
| 5 | Read Vector 2 to A Bus from Translator |
| 6 | Disable IO Interrupts |
| 7 | Read Argument to B Bus from Translator |
| 8 | Read MCP Data Entry Switches to C Bus |
| 9 | Not assigned |
| A | Other functions |
| B | Not assigned |
| C | Write Micro Control Memory |
| D | Read Micro Control Memory |
| E | Read IO Interrupts to A Bus |
| F | Not assigned |

Addressing: Each IO module must respond to one or more device addresses. The device address is made up of the RA Select field (RSA01 – RSA03) and the Device Select field (EMIT28 – EMIT31), where RSA01 is the most significant bit and EMIT31 is the least significant. The particular address or addresses to which the module is to respond must be assignable at the time the module is installed by means of push-on jumpers, switches, or some other method which can be quickly accomplished. For consistency, it is desirable that all IO modules use the same method for address selection.

Figure 17:
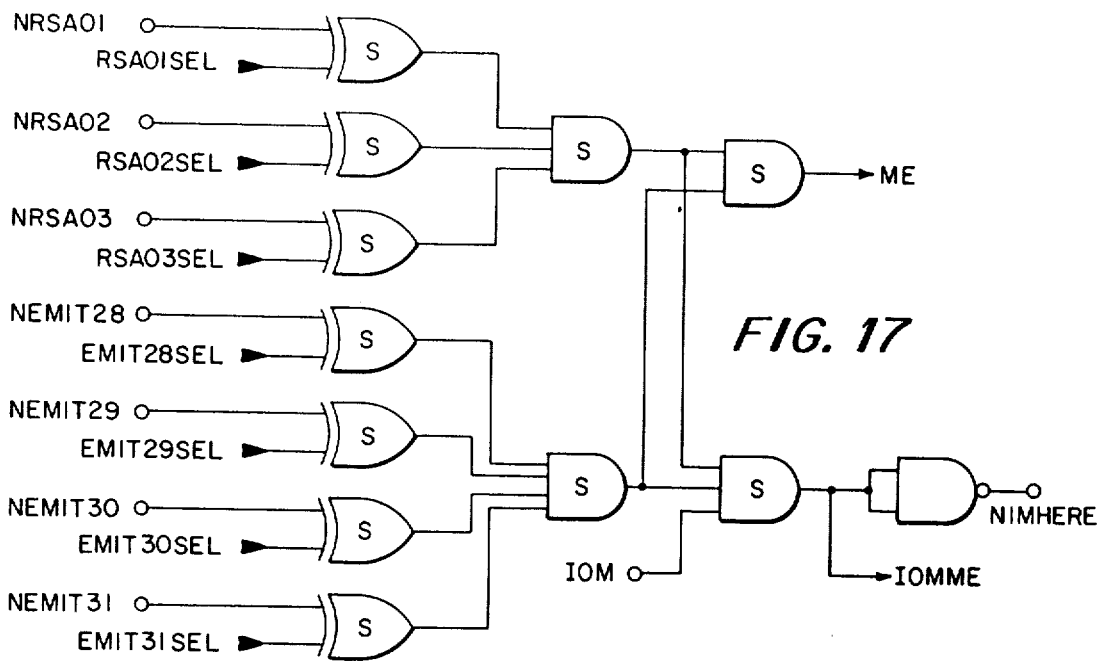
FIG. 17 is a logic block diagram of the address decoding logic for the processor's IO and interrupt system.

The logic for address decoding is diagrammed in FIG. 17. Where the gates marked S are Schottky gates.

The signal IOMME (IOM Module Enable), generated as shown on FIG. 17, is used to enable the IO Module to respond to any command from the IO Control field, including the transfer of data to the A bus and the enabling of the C bus input buffers. ME (Module Enable) is used primarily to enable the external condition line or lines onto the NEXT line. NIMHERE is used to control the C bus buffer in an expanded IO arrangement.

A Bus Connect: The A bus provides the path users must take when imputting data to the processor. This path allows the user to enter data on one side of the Arithmetic Logic Unit 44, perform some function on that data, and strobe the result back to the user from the C Bus, all during one processor cycle time.

Figure 18:
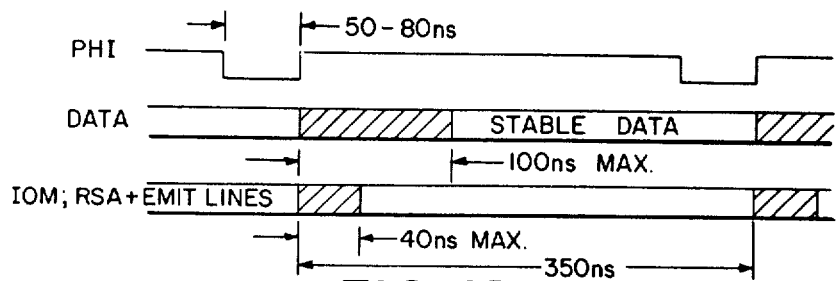
FIG. 18 is a timing diagram of A Bus and B Bus timing.

The logic for transferring input data to the A bus may be as follows:
Enable Data to A Bus — iomme.input.naxiocont
where IOMME = IO module selected by microinstruction, as diagrammed in FIG. 17.
INPUT = Configuration of the IO Control field, EMIT24 – 27 specifying either data or status information input to the processor.
B Bus Connect: The B Bus provides the path for users to take when supplying a direct memory address to the processor when using the fast interrupts, as explained in a following section. The logic and timing for connection to the B Bus are identical to those for connection to the A bus, except that the control equation is modified as follows:
Enable Data to B Bus = IOMME.DMAINPUT
where DMAINPUT = Assigned configuration of the IO Control field specifying direct memory access.
A Bus and B Bus timing is shown in FIG. 18.

C Bus Connect: The C Bus 3 is the path for transferring data and control information from the processor to an IO module. Data on the C bus is available for any IO module to acquire.

Figure 19:
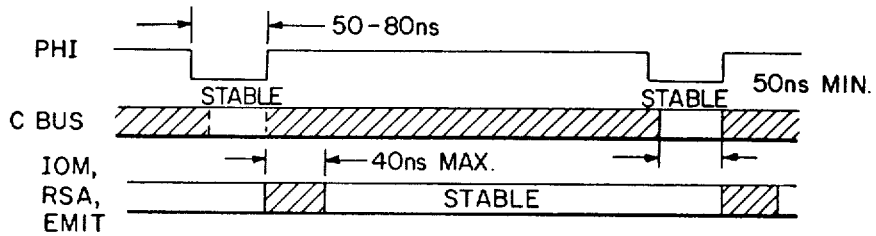
FIG. 19 is a timing diagram of the C Bus timing.

The logic for transferring output data from the C Bus is as follows:
Enable C Bus to IO Module — IOMME
where IOMME = IO module selected by microinstruction, as diagrammed in FIG. 17.
C Bus timing is shown in FIG. 19.

IO INTERRUPT

The processor accommodates two types of interrupt systems: fast interrupts for high-speed data transfers in or out, and multiplexed input/output interrupts. The fast interrupt system returns a hardware response as soon as the interrupt has been accepted, while the IO interrupt system does not provide a hardware acknowledge signal. The IO interrupt system is discussed in this section and the fast interrupt system is a following section.

The processor accepts up to 128 inputs to the multiplexed input/output interrupt, corresponding to the 128 device addresses. This interrupt can be enabled or disabled by micro opcodes in the MCR Control field. Requests can be asynchronous with respect to the system clock as they do not interrupt the execution of a microinstruction during its clock period. An interrupt does take control at the end of the cycle, providing it is not disabled.

The request for an IO interrupt is transmitted to the processor by means of the signal NIOINT. Then the processor transfers the device address of the IO module with the highest priority which has an IO interrupt pending to the A bus and responds accordingly. IO interrupt operation is next described in detail.

Figure 20:
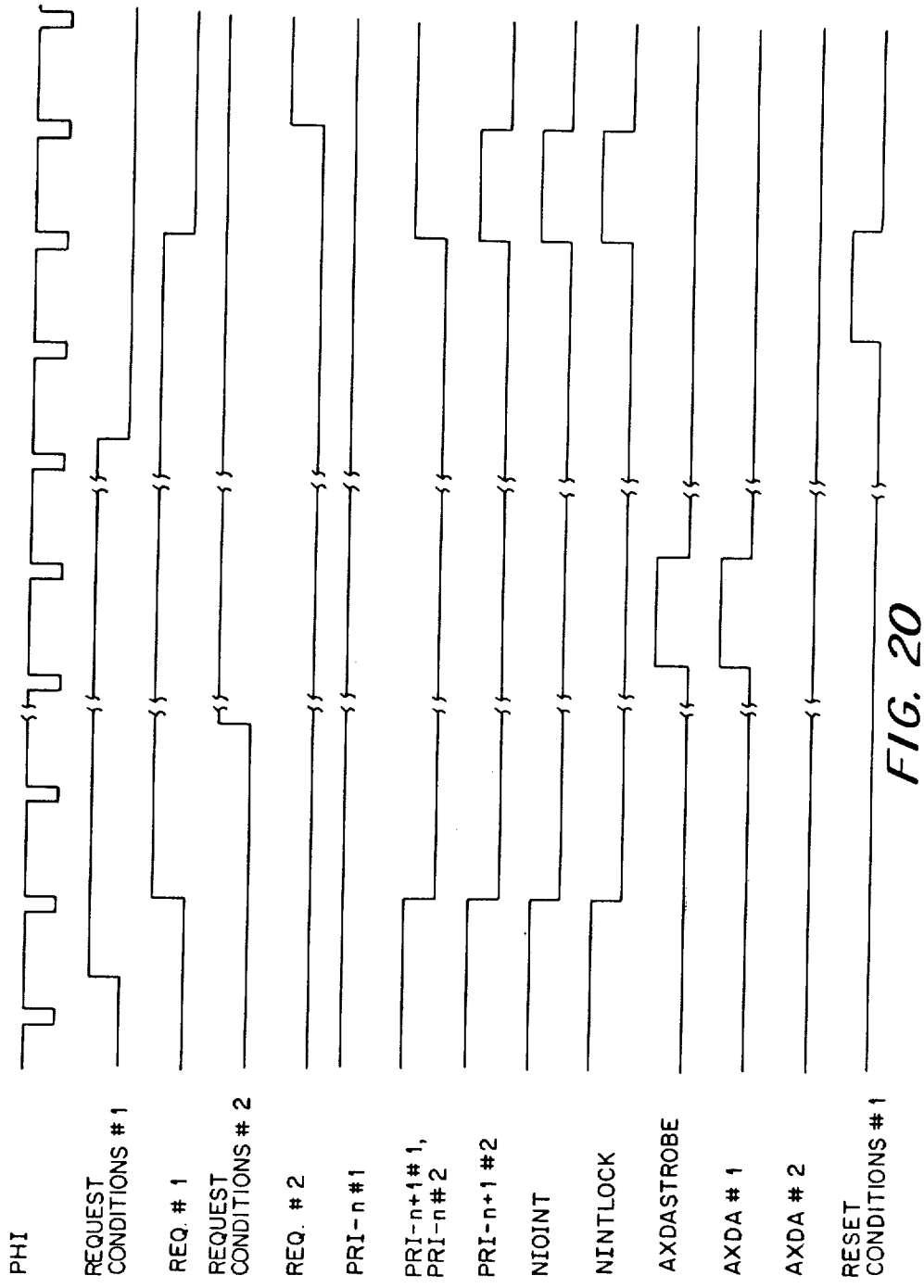
FIG. 20 is a timing diagram of a typical multiplexed IO interrupt.

Interrupt Operation; The processor provides a single input line, NIOINT, which can be pulled low by any IO module to signify that the module has an IO interrupt pending. FIG. 20 is a diagram of multiplexed interrupt timing. In the processor, NIOINT low sets an IO Interrupt flip-flop on the next system clock. The flip-flop output is applied to the Interrupt Priority logic and then to logic that generates control memory address x'8'. As soon as this address becomes available, it is used to reset the flip-flop. Thus, the IO Interrupt flip-flop remains high until the IO interrupt is reached in priority order.

The next PHI after control memory address x'8' becomes available loads the microinstruction at this location into the microcontrol register 24 for execution. Thus, if no higher priority interrupt interferes, the microinstruction is loaded into the microcontrol register 24 by the second PHI after NIOINT goes low. This microinstruction should contain the Push micro opcode in the Branch Control field and the Immediate Address micro opcode in the C bus/Register Control field. The Immediate Address micro opcode, it will be recalled is interpreted by the processor in two ways, depending on whether IO Mode is true or false.

If IO Mode is true, the device address of the highest priority IO module with an interrupt request pending is gated to the A bus in the following format:

| 0 | 1 | 2 | 3 | 4 | 5 | 6 | 7 | 8 | 9 | 10 | 11 | 12 | 13 | 14 | 15 | |
|---|---|---|---|---|---|---|---|---|---|----|----|----|----|----|----|---|
| x | x | x | x | x | x | x | x | 1 | Device Address | | | | | | | A Bus |

Bits 0–7 should not be driven by the IO module and bit 8 must be forced to 1 by the IO module.

The processor then appends the contents of the ALU select field from the microinstruction to the above Device Address to generate an address as shown below:

| 0 | 1 | 2 | 3 | 4 | 5 | 6 | 7 | 8 | 9 | 10 | 11 | 12 | 13 | 14 | 15 | |
|---|---|---|---|---|---|---|---|---|---|----|----|----|----|----|----|---|
| x | x | x | x | ALU | Sel | | 1 | Device Address | | | | | | | | A Bus |

This 12 bit address, now on the A bus, is used by the processor in the same way as an Immediate Address, which is gated from the microcontrol register 24 to the A bus. In either case, the control memory 22 jumps to the 12 bit address. Therefore, the Push microinstruction branches to a table in control memory 22 between $x'080'$ and $x'0FF'$, assuming ALU Select = 0. The size of this table is dependent on the number of device addresses used in the system.

The contents of this table are a series of unconditional branch instructions with Immediate Addresses which cause the processor to branch to the first microinstruction in the device handler interrupt routine. Thus, the total time from NIOINT going low, assuming no interference from a higher priority interrupt, to the start of execution of the first microinstruction of the interrupt handler is 1.05 microseconds minimum to 1.40 micro seconds maximum. The processor execution time required is 0.70 microseconds.

Alternatively, if IO Mode is false in the original Push microinstruction, the Immediate Address bits from the microinstruction are used as the branch destination. In this case the device address of the interrupting IO controller can be recovered later by executing a microinstruction with MCR = $x'E'$. This micro opcode causes the IO device controller to gate its device address to the A bus in the format shown above.

Interrupt Disable: The multiplexed IO interrupt is automatically disabled by the processor when any type of interrupt except the fast interrupts is requested. The disabled occurs at the time of execution of the microinstruction found in the interrupt location in control memory 22. If the microinstruction contains a Push micro opcode, the current status of the mutliplexed IO enable flip-flop is stored in the push stack before the flip-flop is reset. At the end of the interrupt handler subroutine, a Pull micro opcode in the final microinstruction restores the enable flip-flop to its original status.

Also, once an interrupt is requested, the signal NINT-LOCK goes low. This signal must be used on the IO module to prevent the initiation of an IO interrupt request until it goes true. An IO module that is already requesting an IO interrupt must continue its request. The purpose of NINTLOCK is to freeze the priority chain so that the IO device controller which had the highest priority at the time of interlock will still have the highest priority when the time comes to gate its device address to the A bus.

The IO device controller maintains its interrupt request until an IO command is received by the controller to remove the request. The IO command can be accomplished either by use of the IO Control field or by means of a command word via a C bus transfer.

IO Interrupt Logic: The logic functions necessary to implement IO Interrupt are the priority chain, the interrupt request, and gating the device address to the A bus.

Figure 21:
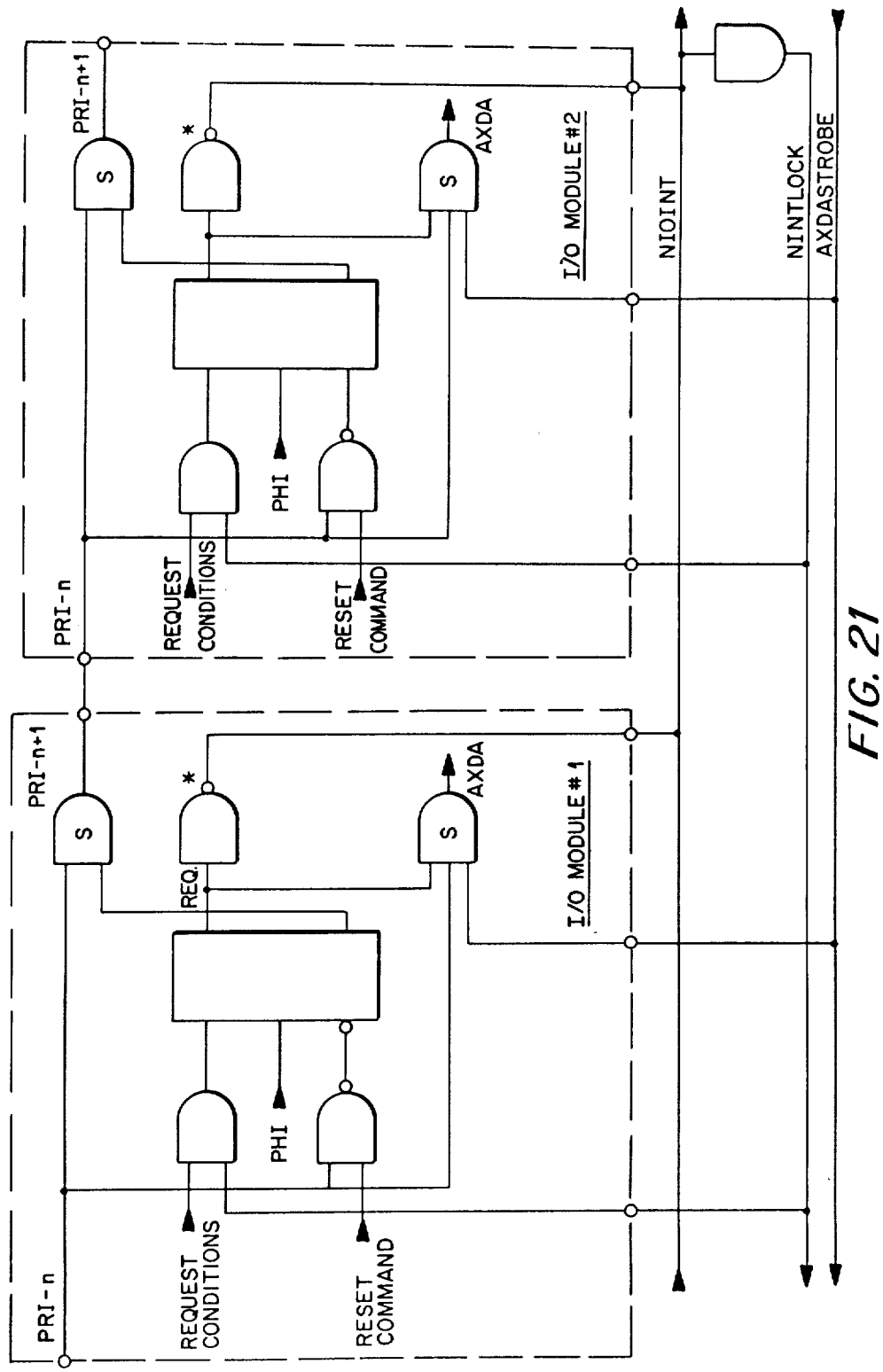
FIG. 21 is a block diagram of IO modules in a multiplexed IO interrupt priority string.

The priority chain or string consists of an input signal to each IO module, PRI$n$, and an output signal from each module, PRI$n$+1 as shown in FIG. 21. The equation is:

PRI$n$+1 = PRI$n$·NREQ where NREQ = no interrupt request pending

This equation must be implemented by each IO module that uses the multiplexed IO interrupt. FIG. 21 shows the artical logic for IO Modules in a multiplexed interrupt priority string.

Figure 22:
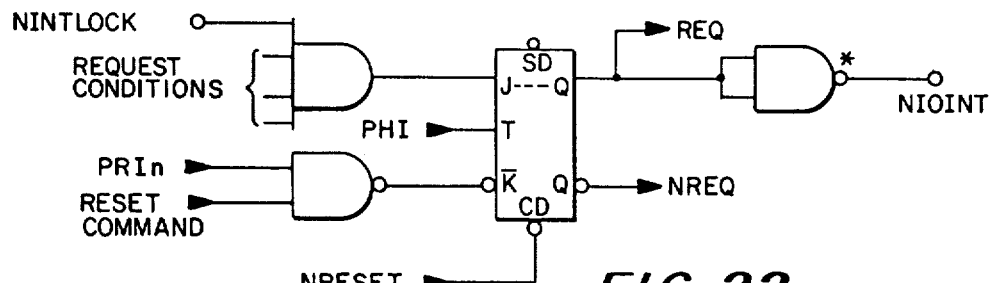
FIG. 22 is a logic block diagram of the IO interrupt request logic of the device of the invention.

The interrupt request, NIOINT, may be implemented as diagrammed in FIG. 22.

FIG. 21 additionally shows the relationship between two IO modules in an IO interrupt priority chain. The priority connections are prewired in such a way that the ranking of an IO module in the priority string is determined by the physical location into which it is plugged. The lowest ranking or highest priority devices are closest to the processor.

External Condition Test: The Branch Control field of the microinstruction contains two micro opcodes used to test an external condition present on an IO Module:

$x'4'$ Test/Branch on External Condition Set $x'5'$ Test/Branch on External Condition Reset Each IO module may provide one or more external status conditions to a common signal, NEXT, when RA Select and Device Select fields contain an IO address assigned to the module. Moreover, more than one external condition per IO address may be selected and multiplexed to NEXT by use of additional signals such as the A bus Control field, BCA08 and BCA09. On the other hand, the external condition test capability can be ignored if not required in a particular application.

The operations in the processor resulting from these two Test/Branch micro opcodes have been previously set forth. However, briefly, if a test is successful, the least significant 12 bits of the C bus serve as the next microaddress in a procedure requiring two clock periods. If the test is unsuccessful, the microaddress increments in sequence, requiring one clock period. Moreover, because the Device Select field is employed in addressing the external conditions, the Immediate Address field can not be used to supply the new microaddress.

Figure 24:
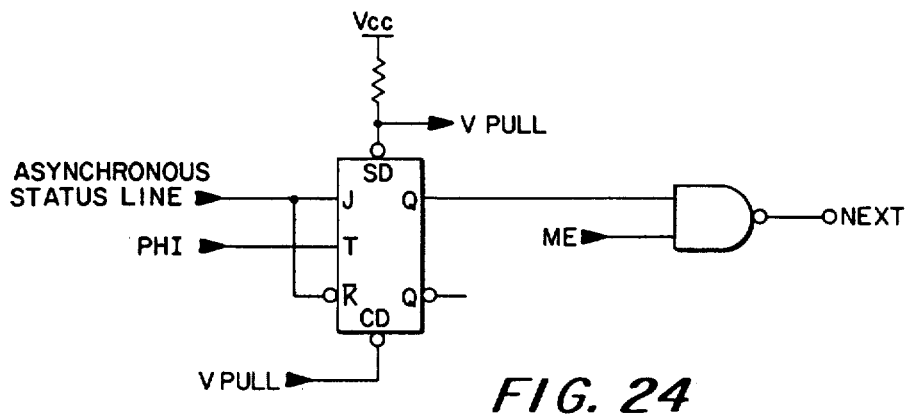
FIG. 24 is a block diagram of an External Condition Logic Circuit.
Figure 25:
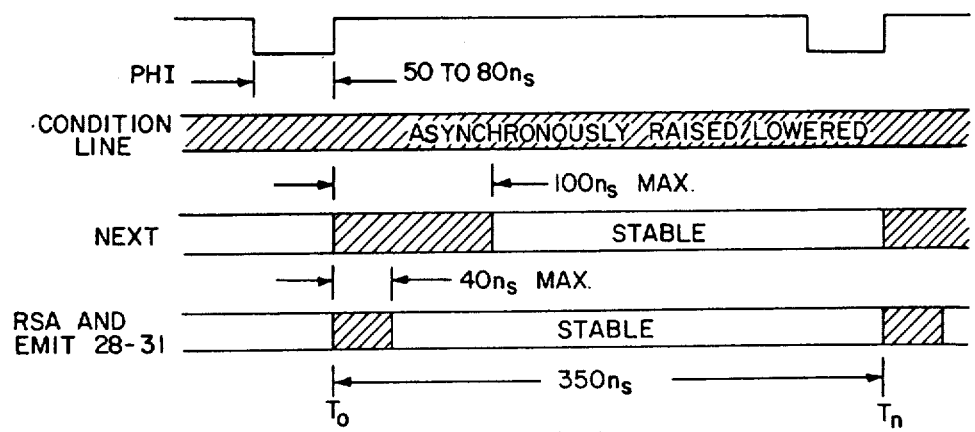
FIG. 25 is a timing diagram of External Condition timing.
Figure 23:
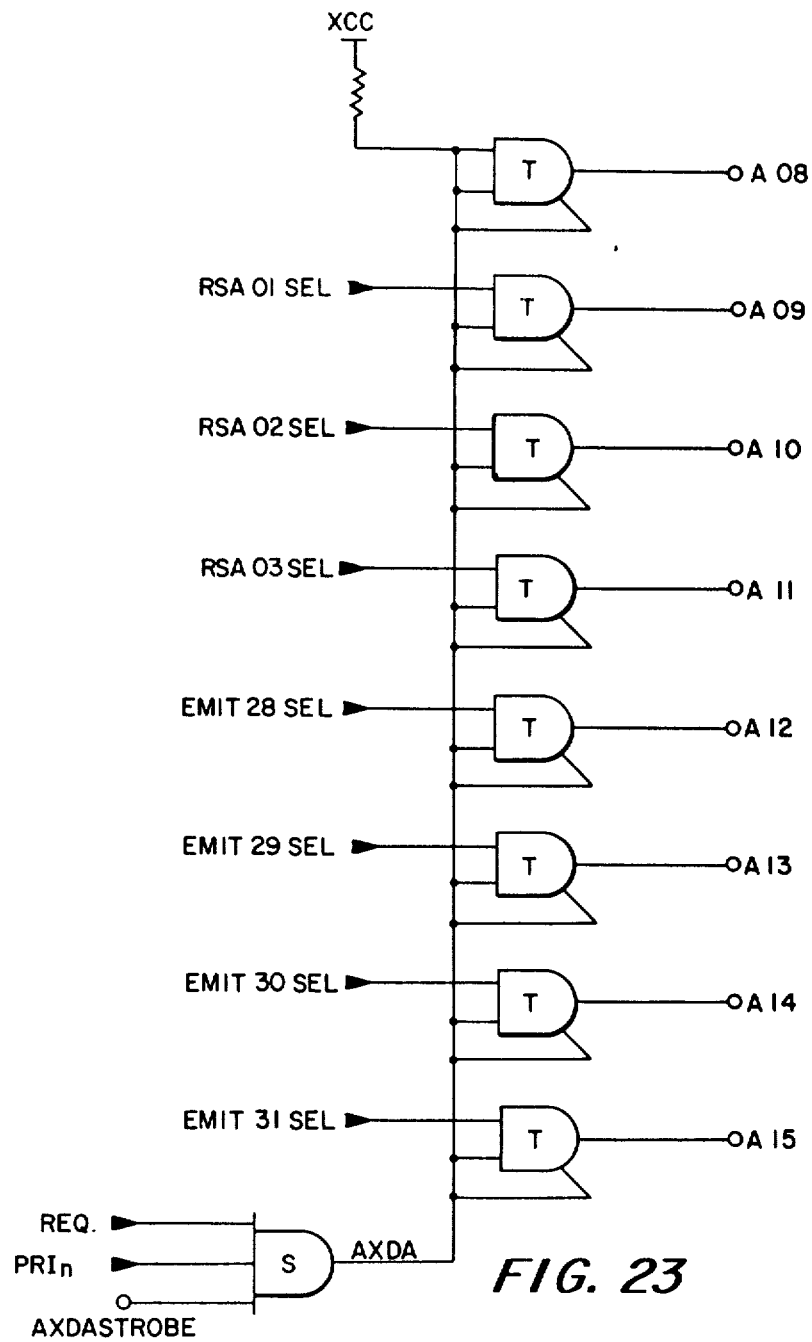
FIG. 23 is a logic block diagram of the IO device address to A Bus logic.

The logic for a single external condition interface is shown in FIG. 24. A timing diagram for external condition timing is set forth in FIG. 25. Both seem self explanatory.

Fast Interrupts: The processor is capable of accepting two Fast Interrupt Requests from every IO module location. The fast interrupts are used primarily for high-speed data transfers between IO devices and scratch pad/main memory 16, 18. The fast interrupts differ from the multiplexed IO interrupts in two respects. First they automatically return a response signal and, second, they cycle-steal a single cycle from processor operations.

During this cycle the processor executes a single microinstruction that typically transfers a word or byte from an IO bus to scratch pad/main memory 16, 18 and from scratch pad/main memory to an IO bus. The scratch pad/main memory 16, 18 address may come from a general register 10 (which is incremented by the same microinstruction) or from the IO module (device controller).

Cycle stealing refers to the insertion of an out-of-sequence microinstruction into the ordinary sequence of processor operations without affecting the status bits or the next microaddress. The state of the processor is not stored in the push stack and, thus, does not require removal from the push stack by a later microinstruction in order to resume the interrupted sequence. Rather, after the clock cycle in which the out-of-sequence microinstruction is executed, the SCU can resume operation directly on the next microinstruction. The effect is that the fast interrupt capability can be employed to achieve direct access to scratch pad/main memory 16, 18 or DMA.

Each fast interrupt is limited to stealing no more than one cycle out of every two. Thus, in making transfers to/from scratch pad with the clock period at 350 ns, each transfer takes 700 ns, equivalent to a maximum throughput rate of 1.428 mega words per second. Transfers to/from main memory 16 may occur every 1.05 to 1.4 microseconds, depending on whether the microinstruction executed between two interrupt microinstructions is a one- or two-cycle instruction, equivalent to a maximum throughput rate of 714 kilo words per second. If both fast interrupts are running simultaneously at miximum throughput rate, any other processor microinstruction execution is locked out, that is, 100 percent of the processor bandwidth is used by the fast interrupts.

There are two approaches to using the fast interrupt capability. The first requires less hardware, but limits the use of the fast interrupts to a single IO device. The second approach requires a little more hardware, but shares the fast interrupt capability among many IO devices.

Figure 26:
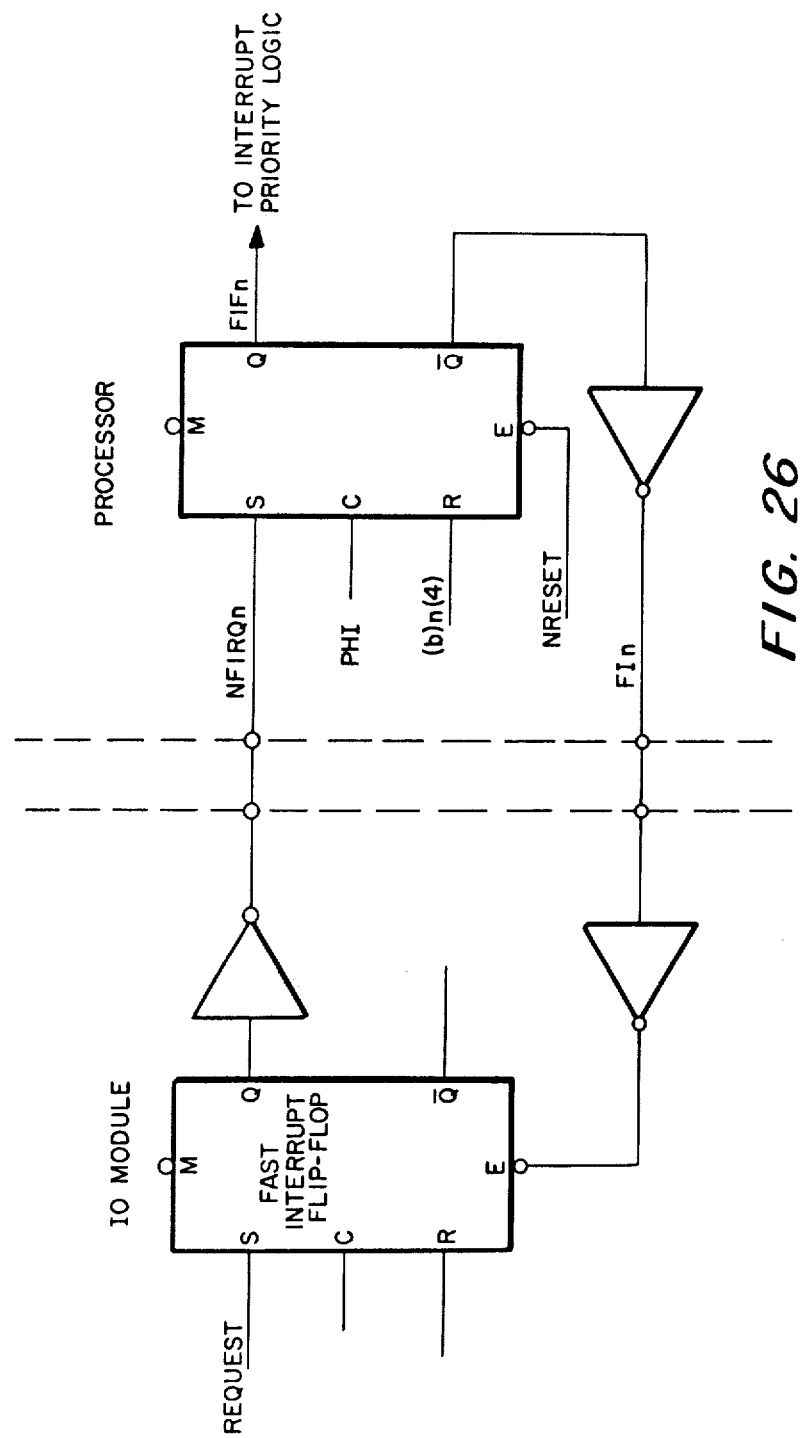
FIG. 26 is a block diagram of the Fast Interrupt Request and Response to/from the processor.

Logic and Timing: Receipt of Fast Interrupt Request 1 or 2 from an IO module causes Fast Interrupt flip-flop 1 or 2 in the SCU interrupt logic to set on the next PHI and to return Fast Interrupt response 1 or 2 to the IO mocule. One possible logic arrangement is diagrammed in FIG. 26 and the timing, in FIG. 27.

The true output of the Fast Interrupt flip-flop is applied to Interrupt Priority logic in the processor and then to logic that generates control memory address $x'6'$ for Fast Interrupt 1 or $x'7'$ for Fast Interrupt 2. As soon as this address is available, signifying that the fast interrupt has been accepted by the SCU, it is used to reset the Fast Interrupt flip-flop.

Figure 27:
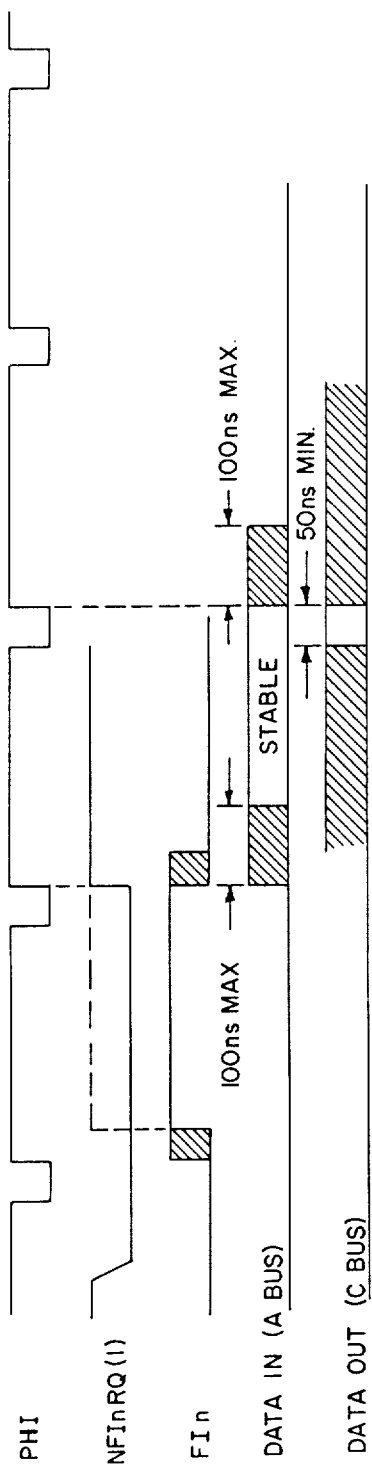
FIG. 27 is the Fast Interrupt timing diagram for a Single Data Transfer.
Figure 28:
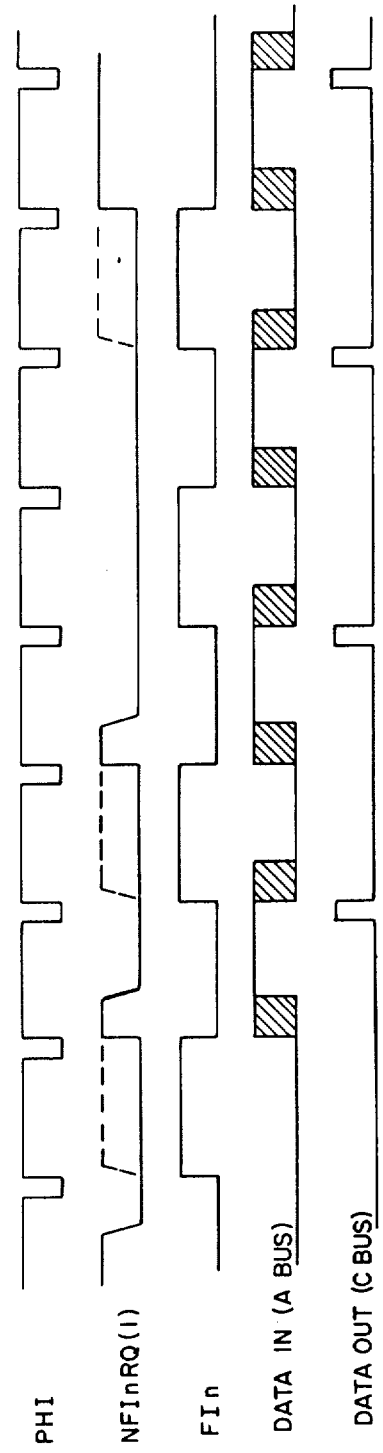
FIG. 28 is a Fast Interrupt timing diagram for a Multiple Data transfer.
Figure 29:
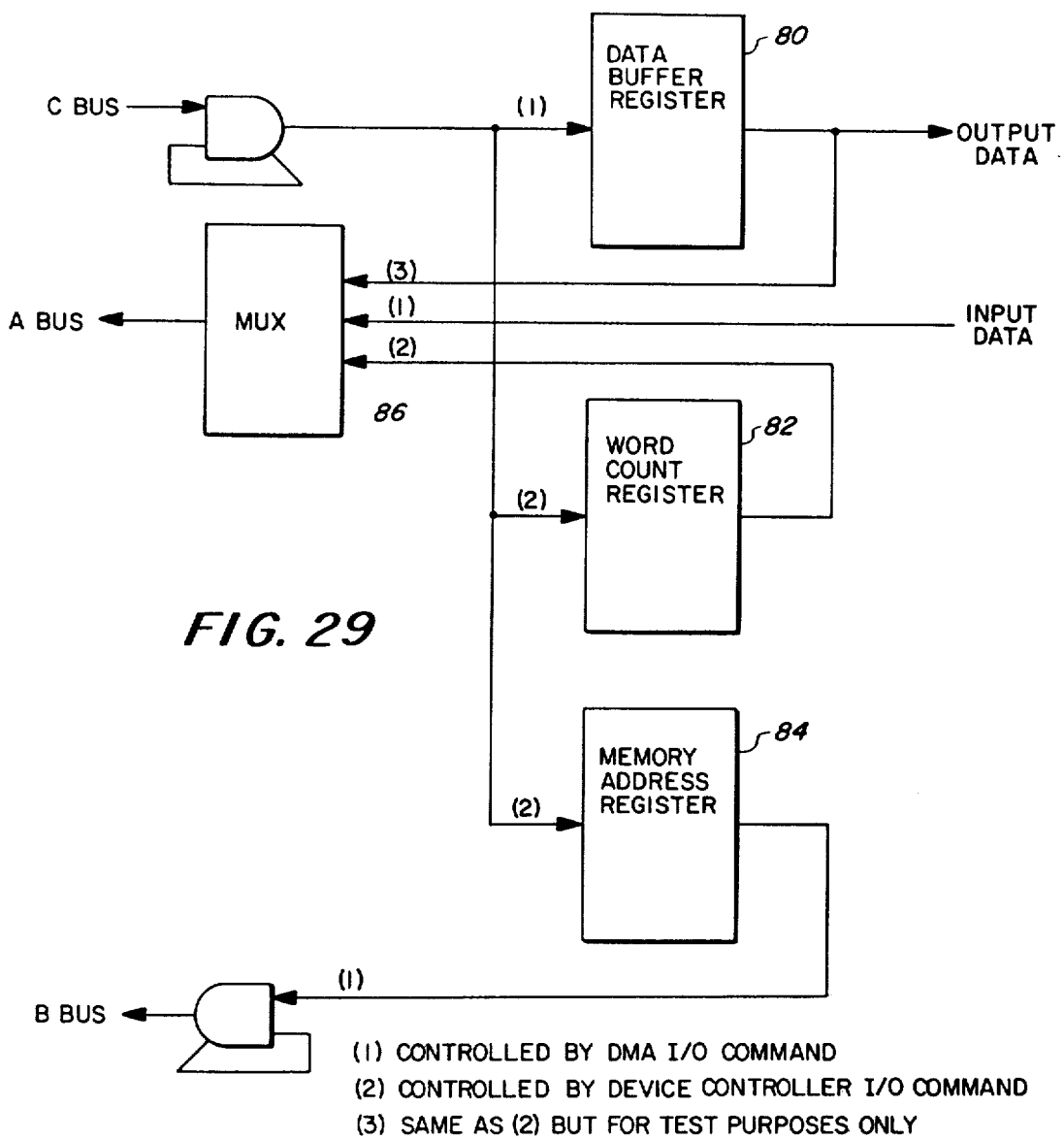
FIG. 29 is a block diagram showing essential elements of DMA.

FIG. 27 shows the fast interrupt interface timing for a single data transfer or for multiple transfers at relatively slow throughput rates. FIG. 28 shows timing at maximum throughput rates. Times shown on the figures are merely exemplary. At maximum throughput, the interrupt request generated by the IO module NFIRQn, may be held low for the entire duration of a block transfer. At the end of the transfer, NFIRQn must be raised within 180 ns, in this example, after the falling edge of the response pulse, FIn, for the last word to be transferred. Raising NFIRQn within this limit assures that an extra interrupt is not triggered.

Single High-Speed Device: In this approach both fast interrupts are connected in a single high-speed device controller (or IO module), one may be used for transfers-in and the other, for transfers-out. In addition, a multiplexer IO interrupt capability is often required to enable the IO module to initialize and terminate a series of transfers.

Before starting fast interrupt data transfers, it is necessary to have the address of the first scratch pad/main memory location to be used in a general register, where it is available to the B bus. The general register 10 employed for this address is the one defined by the RB Select field of the microinstruction in Fast Interrupt location $x'6'$ or $x'7'$. This general register, now serving the function of scratch pad/main memory address register, is incremented (or decremented) by the Interrupt microinstruction on each transfer to supply the new scratch pad/main memory address.

Each time the user requests service, the IO module generates NFIRQn, the SCU returns an automatic response, and the microinstruction in location $x'6'$ or $x'7'$ is executed. This single microinstruction typically transfers data to/from the IO module into/out of the scratch pad/main memory location specified by the scratch pad/main memory address register and increments or decrements this register.

A series of Fast Interrupt transfers is normally terminated by a multiplexed IO interrupt. As one example, before starting data transfers, the firmware may transmit a word count via the C bus to a word-count register on the IO module. When this count is reached, the IO module may initiate a multiplexed IO interrupt to terminate the transfer.

Multiple Devices: In this approach both fast interrupts are connected to two or more IO modules (device controllers), priority is determined by a priority chain between the IO modules, and a scratch pad/main memory address register, located on each IO module, supplies the memory location.

Direct Memory Access: Direct Memory Access refers to the ability to transfer data from an IO device 4 into main memory 16 or from main memory 16 to an IO device 11 with a minimum of interference with the on-going processor operations. Using the fast-interrupt approach, one fast interrupt is treated as a scratch pad/main memory write request and the other as a memory read request. So far, this use of the fast interrupts is no different from the approach for a single high-speed device.

In the multiple-device approach, however, each IO device controller has a scratch pad/main memory address register and a method of getting the register contents on to the B bus when the interrupt microinstruction is executed. Moreover, all the device controllers are assigned a common IO address, called the DMA channel address. Priority among the device controllers on the DMA channel is resolved by a priority chain. However, each device controller also responds to a different and unique IO address for other purposes, such as initializing and terminating a transfer operation.

In operation, then, the microinstructions in the fast-interrupt control memory locations address the common DMA channel, but only the device controller with the highest priority assignment of those ready to transfer or receive data responds. The response consists of placing the current address from its scratch pad/main memory address register on the B bus and, in the case of transfers-in, placing input data on the A bus or, in the case of transfers-out, acquiring data from the C bus. During the same microinstruction period, the processor uses the memory address on the B bus 2 to write data from the A bus 1 into scratch pad/main memory 18, 16 or to read data from scratch pad/main memory to the C bus 3. Thus, in DMA operation, a single microinstruction accomplishes a transfer-in or a transfer out.

The IO device controller in the next highest priority position, if one is ready, can make a transfer in the second-next microinstruction period. In this way, a number of IO devices can interleave data transfers by means of the fast interrupt capability. Any number of IO devices can use this DMA interface, limited primarily by the necessity to keep the combined bandwidth of the devices within the DMA channel bandwidth: 1.428 mega words per second, scratch pad, or 714 kilo words per second, main memory, in this case.

The essential elements of an IO module for the DMA interface, diagrammed in FIG. 4–18, are a data buffer register 80, word count register 82, memory address register 84, and multiplexer 86 to A bus 1. The common DMA channel address is used for data-transfer purposes, denoted by (1) on the diagram. The second address, unique to each IO device controller, is used for passing control information to the device controller, such as device initialization, word count register setup, memory address register setup, and passing status information to the processor. These purposes are denoted by (2) on the diagram. In addition, the contents of the data buffer register and the word count register can be multiplexed to the A bus for test purposes.

Figure 30:
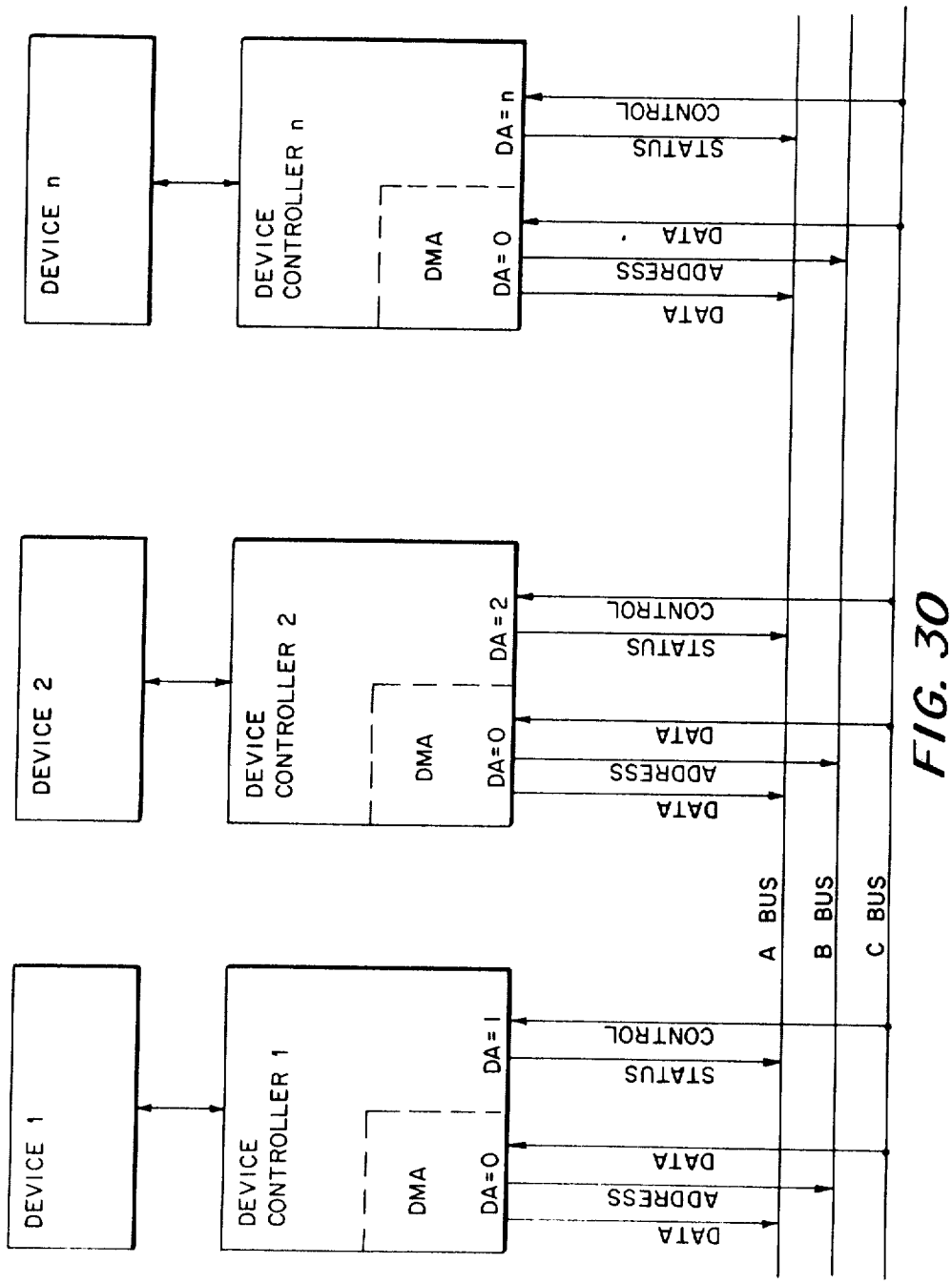
FIG. 30 is a block diagram of a Multidevice Mode arrangement of processors according to the invention.

FIG. 30 is a block diagram showing a series of IO devices and device controllers connected to the tri-bus structure of the processor. For this example, device address 0 has been arbitrarily assigned to the common DMA channel.

Programming DMA: The two fast interrupts are each dedicated to data transfer in one direction. The higher priority interrupt (control memory location $x'6'$) is assigned to data input to scratch pad/main memory 18, 16 and the lower priority interrupt (location $x'7'$) is assigned to data output from scratch pad/main memory 18, 16.

Programming the DMA makes use of the following command assigments in the IO Control field.

priority having an interrupt pending) supplies both the data to be stored and the memory address where it is to be stored. The data is placed on the A bus and the memory address on the B bus. The microinstruction for this function is placed in control memory location $x'6'$ and appears as follows:

Read data and memory address from user:
Location $x'6'$: $x'n000\ 301m'$

Device Select portion of DMA address

Read data and memory address from IO module

Write scratch pad/main memory

RA Select portion of DMA address plus IOM = 1

IO Control = $x'2'$, along with IOM = 1 and Branch Control − $x'2'$, is decoded by all IO modules sharing the DMA channel. The IO module (with the highest priority) supplies the memory address of the scratch pad/main memory 18, 16 location in which the data for the user is to be found. This memory address is placed on the B bus. Data from scratch pad/main memory is taken from the C bus by the IO module 4 for transfer to the IO device. The microinstruction for this function is placed in control memory location $x'7'$ and appears as follows:

Read scratch pad/main memory address, write data to user:
Location $2'7'$: $x'n000\ 202m'$ Device Select portion of DMA Address Write output data to user, read memory address to B bus Read scratch pad/main memory RA Select portion of DMA address plus IOM = 1

IO Control = $x'4'$ or $x'C'$, along with IOM = 1, is decoded by all IO modules sharing the DMA channel. These codes disable the Fast Interrupt Request lines from the DMA channel to the processor and, consequently, disable the user's ability to write to or read from scratch pad/main memory. These codes would be used in an executive routine or priority driver or in a power shut down sequence. The fast interrupts on each IO module must be re-enabled separately, using the command/status device address.

IO Control = $x'A'$, along with IOM = 1, is decoded by

| IO Control | | | | Function | |
|---|---|---|---|---|---|
| 24 | 25 | 26 | 27 | Hex Code | |
| 0 | 0 | 0 | 0 | 0 | No action |
| 0 | 0 | 0 | 1 | 1 | Read input data from user to A bus; transfer memory address to B bus. |
| 0 | 0 | 1 | 0 | 2 | Write output data from C bus to user; transfer memory address to B bus. |
| 1 | 0 | 0 | 1 | 9 | Read data buffer register to A bus. |
| 1 | 0 | 1 | 0 | A | Write data from C bus to data buffer register. |
| x | 1 | 0 | 0 | 4 or C | Disable both fast interrupts. |

These commands are described below.

IO Control = $x'1'$, along with IOM = 1 and Branch Control = $x'3'$, is decoded by all IO modules sharing the DMA channel. The IO module (with the highest all IO modules sharing the DMA channel. This code takes data from the C bus and stores it in the data buffer register. A particular data buffer register is selected for test by disabling all IO modules on the DMA channel by means of IO Control — $x'4'$ or $x'C'$ and re-enabling one IO module by means of the command/status device address. This operation tests the functioning of the DMA channel, DMA address decoding, and the data buffer register on the selected IO module. This test is similar to writing data to an IO module. This code is handled as an in-line microinstruction, not one executed from the fast-interrupt control memory location and therefore is not dependent on whether an interrupt is pending.

IO Control = $2'9'$, along with IOM = 1, is decoded by all IO modules sharing the DMA channel. This code transfers data from the data buffer register to the A bus. It is then up to the rest of the microinstruction to determine what to do with the data on the A bus. This code is used in conjunction with $x'A'$ to check the data buffer register and DMA address decoding.

Programming for the command/status interface (which is the one addressed by the second, unique address on each IO module of the DMA type) is not restricted with one exception. Provisions must be made in the command structure to enable each device controller individually to use the fast interrupts and to disable all device controllers together from using the fast interrupts.

Figure 31:
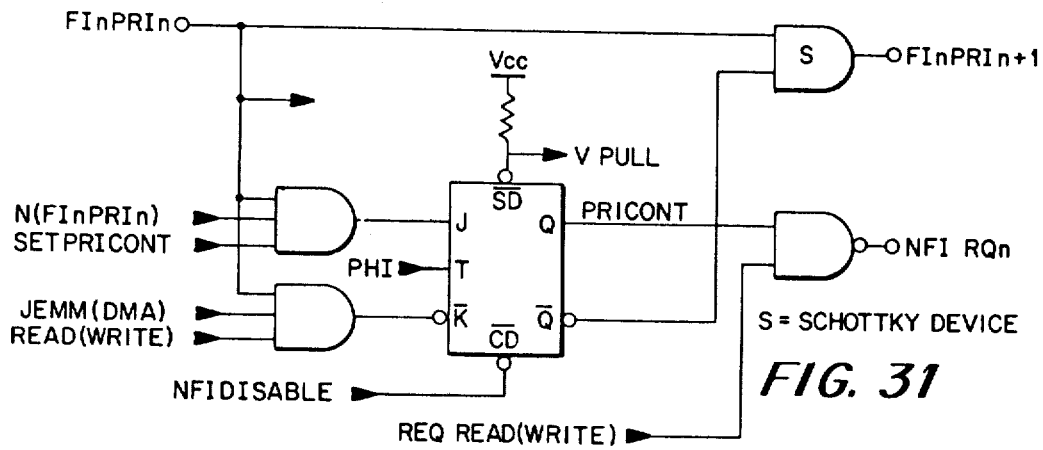
FIG. 31 is a block diagram of Priority Control Logic of the device.
Figure 32:
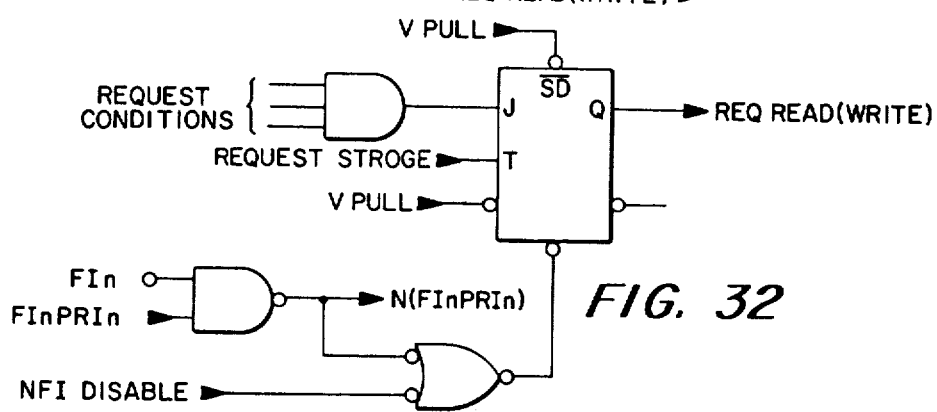
FIG. 32 is a block diagram of Request Control Logic.

Priority Chain: The priority chain, shown in FIG. 31, determines which device controller may respond to the DMA address. Each device controller must provide this logic for each fast interrupt used (some controllers may not require bidirectional data transfer). FIG. 32 shows a typical interrupt request flip-flop.

The equations for the priority chain are as follows:
FInPRIn+1 = FInPRIn·NPRICONT
Set PRICONT = FInPRIn·NFIn·SET·PHI
Reset PRICONT = FInPRIn·IOMME(DMA)·READ·· PHI + FIDISABLE where SET = output of the interrupt request flip-flop if that flip-flop is not clocked by PHI, or the J input signal to the interrupt request flip-flop if the flip-flop is clocked by PHI.
FInPRIn+1 = the priority string output signal
FInPRIn = the priority string input signal
IOMME(DMA) = the decoded DMA channel address anded with IOM
READ = Read command, $x'2'$, decoded from the IO Control field. Use Write command for Fast Interrupt 1 and Read command for Fast Interrupt 2.
FIDISABLE = Fast Interrupt Disable flip-flop, set by IO control = $x'4'$ or $x'C'$, Disable Fast Interrupts.

Figure 33:
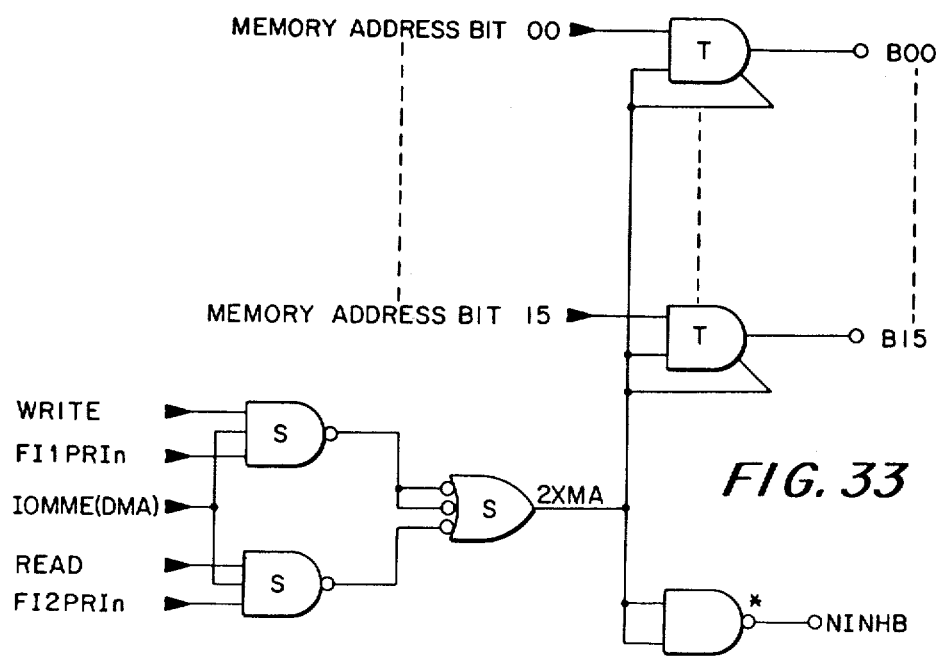
FIG. 33 is a logic block diagram of the B Bus Control Logic.

Memory Address to B bus: The B bus control logic, as shown in FIG. 33, gates the output of the scratch pad/main memory 18, 16 address register to the B bus 2 when IO control = $4'1'$ or $'2'$. The memory address is needed by the processor whenever a transfer-in or a transfer-out is made.

Figure 34:
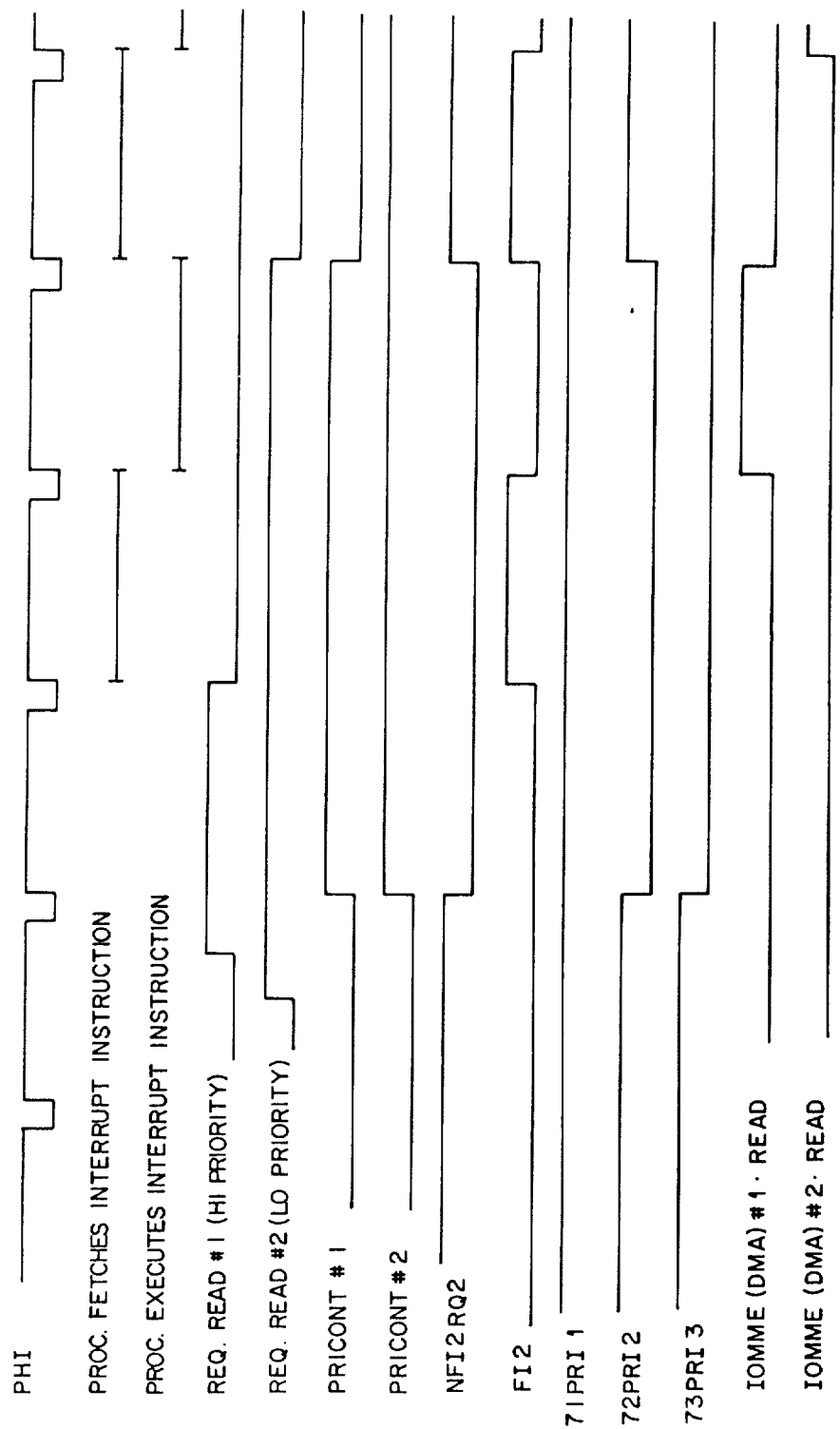
FIG. 34 is a timing diagram of the Fast Interrupt Priority Control of the device.

The equation for the memory address transfer term is as follows:
BXMA = FI1PRIn·IOMME(DMA)·WRITE + FI2PRIn·IOMME(DMA)·READ NINHB inhibits the processor from placing other data on the B bus. FIG. 34 is a timing diagram showing the various interface signals when two device controllers of the DMA type request interrupts simultaneously. The timing assumes the interrupt request (REQREAD) is implemented as diagrammed in FIG. 32.

Standard IO Control: Seven fields of the microinstruction participate in the control of functions on the SIOM. Six of these fields have been characterized, for input/output purposes, previous sections, and fully defined therein. The seventh field, IO control, is defined below, as used on the SIOM.

When IO Mode is 1 and C bus/Register Control is not $x'B'$, bits 24–27 become the Input/Output Control field.

| Bit | | IO Control |
|---|---|---|
| 24 | 25 | Function |
| 0 | 0 | Read the IO register addressed by the RA Select and Device Select fields to the A bus. |
| 0 | 1 | Read the IO register addressed by the RA Select and Device Select fields to the A bus and write the data from the C bus to the IO register addressed by the RA Select and Device Select fields. |
| 1 | 0 | Read the IO bus 16 addressed by the RA Select and Device Select fields to the A bus. |
| 1 | 1 | Read the IO bus 6 addressed by the RA Select and Device Select fields to the A bus and write the data from the C bus to the IO register addressed by the RA Select and Device Select fields. |

| Bit | | Special Control |
|---|---|---|
| 26 | 27 | Function |
| 0 | 0 | No change. |
| 0 | 1 | Disable output to the IO bus 6. (Inhibits output from IO register byte addressed by RA Select, Device Select and A bus Control fields to corresponding section of IO bus. This output remains disabled until Enable IO Bus occurs.) |
| 1 | 0 | Enable output to IO bus 6. (permits content of IO register byte addressed by RA Select, and Device Select and A bus Control fields to be transferred to corresponding section of IO bus. This output remains enabled until Disable IO Bus occurs.) |
| 1 | 1 | Not assigned. |

Figure 35:
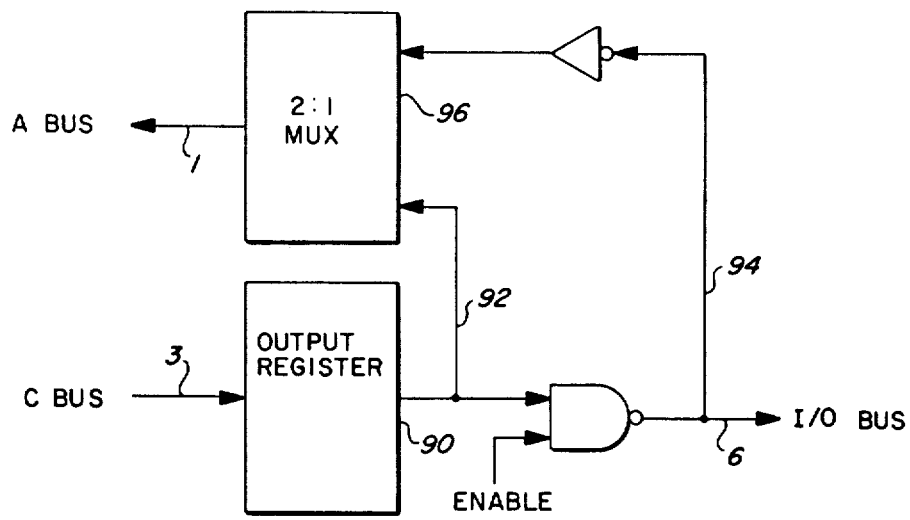
FIG. 35 is a block diagram of the IO Bus of the processor according to the invention.

IO Bus: The IO Bus 6 is a bidirectional bus, show as a single line in FIG. 35. Data to be output by the SCU to the bus 6 is transferred from the C bus to a buffer register 90, using either the "read register/write register" micro opcode or the "read bus/write register" micro opcode. If the corresponding IO byte is enabled for output, the data is gated to the IO bus 6. Data may be read to the A bus 1 from either the output register via line 92 or the IO bus via line 94, the latter allowing the SCU to perform turnaround testing of the module. The 2:1 multiplexer 96 selects the source for the A bus.

Figure 36:
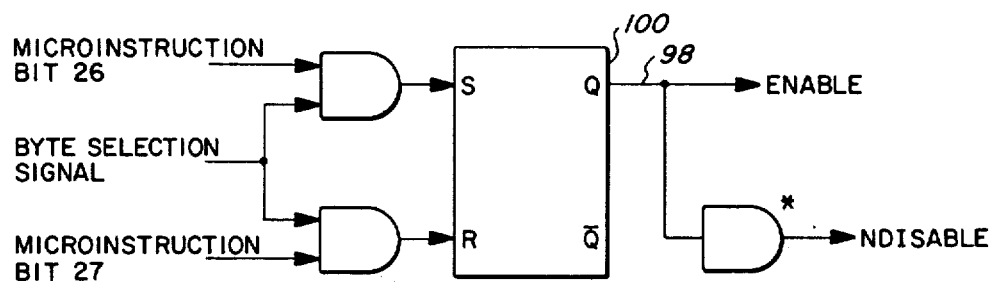
FIG. 36 is a block diagram showing the IO Enable Control logic.

IO Bus Disable: Each byte of the two IO busses 6 (FIG. 1) can be individually enabled for data output to the bus under microprogram control, as diagrammed in FIG. 36. The byte to be enabled is addressed by RA Select, Device Select, and A bus Control. The Q output 98 of the Enable flip-flop 100 gates the output register to the IO bus. Also provided from an open collector driver is a bus direction control signal, NDISABLE.

When NDISABLE is false, output to the IO bus from the IO register of the selected byte is disabled and incoming data can be placed on this section of the IO bus. When NDISABLE is high, output of the selected byte of the IO bus is enabled and this section of the bus should not be used for input.

IO Active: Strobe pulses which are required for an IO interface are normally generated by the microprogram, using a pre-assigned IO bus bit as the strobe signal. This usage minimizes special hardware on the IO module, using microopcode instead.

There are, however, certain instances where this technique is either inconvenient or slow. For these cases, a single IO Active signal is provided on each IO module. This signal is keyed to one of the four IO bytes on the module (the least significant byte of the even-numbered register).

IO Active is generated unconditionally by two values of the IO Control field:

10 Read IO Bus to A bus
11 Read IO bus to A bus and Write IO Register from C bus IO active can be generated conditionally by the following value of the IO Control field.

01 Read IO Register to A bus and Write IO Register from C bus. The condition is that the byte is enabled for output at the end of execution of the microinstruction, that is, either enabled by the current microinstruction or enabled by a preceding microinstruction and not disabled by the current one.

Figure 37:
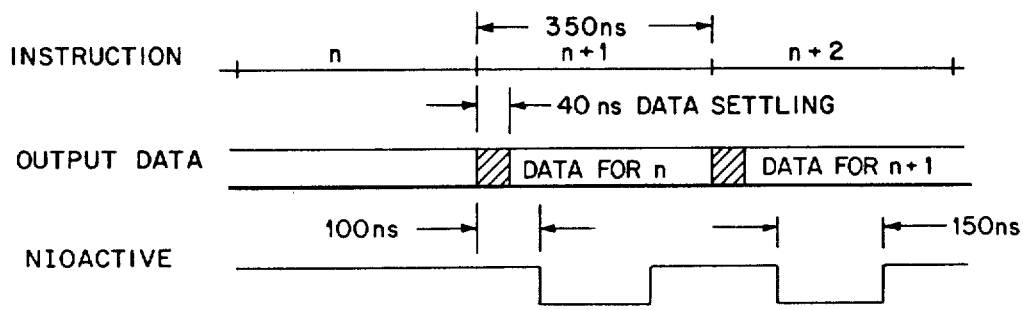
FIG. 37 is a timing diagram of the IO Active signal.

FIG. 37 shows the timing relationship between the instruction execution time, output data, and the IO Active strobe. The IO active strobe occurs nominally 100 ns after the microinstruction execution clock time, thus allowing 60 ns from data stable to the leading edge of the strobe. The pulse is nominally 150 ns in width.

Figure 38:
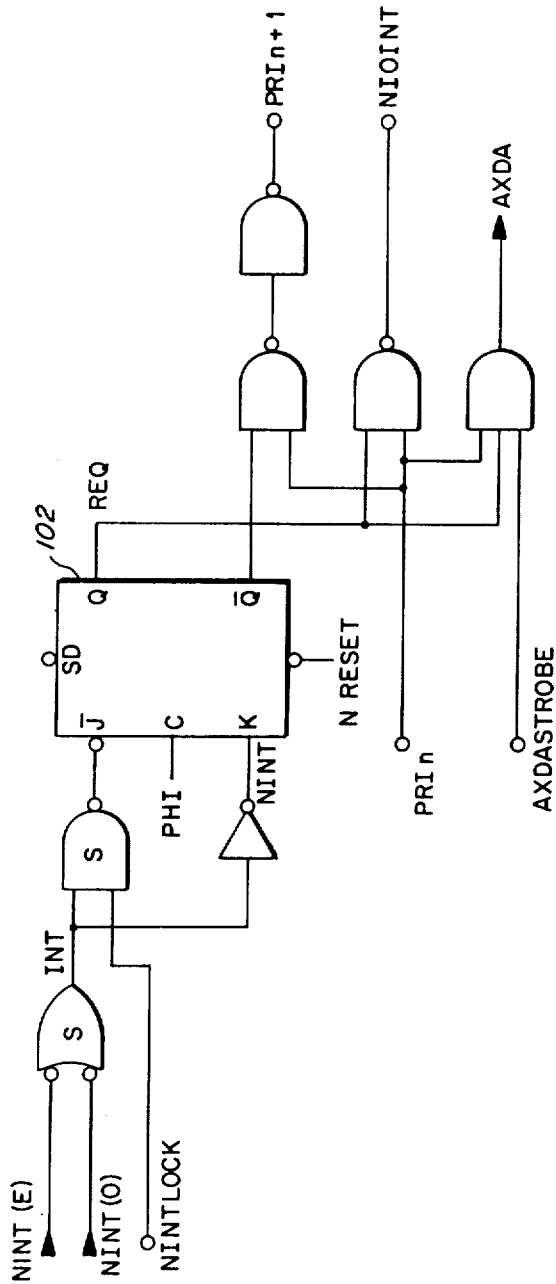
FIG. 38 is a block diagram of the Multiplexer IO Interrupt.

Multiplexed IO Interrupts: The processor has a single interrupt level associated with general input/output. This interrupt level is multiplexed among the IO locations and on the IO Modules is submultiplexed between two interrupt inputs, as diagrammed in FIG. 38.

Receipt of an active-low interrupt, NINT(E) or NINT(O), from the user sets the Request flip-flop 102 on the next system clock, providing the processor signal, NINTLOCK, is high. Request high permits three actions:

1. Causes NIOINT to be pulled active-low, if the particular 10 Module has priority (PRIn = 1), initiating the multiplexed IO interrupt routine in the processor.
2. Inhibits PRIn+1, the priority signal for the next IO module in the priority sequence.
3. Enables transfer of the IO Module device address to the A bus on receipt of AXDASTROBE from the processor.

When the interrupt service routine begins, the processor hardware automatically block disables the multiplexed IO interrupts in order to avoid interference from other IO interrupts. The IO interrupts are re-enabled following the service routine.

Figure 39:
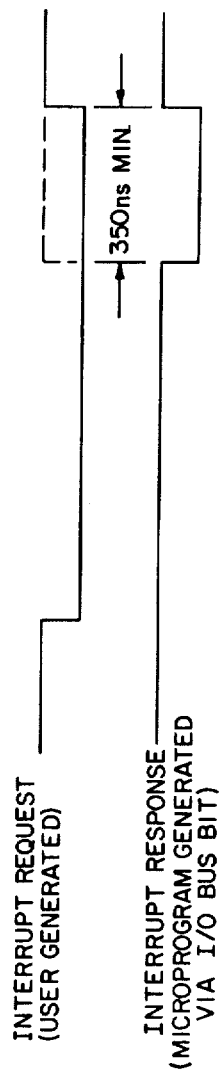
FIG. 39 is a timing diagram of a Multiplexed IO Interrupt.

IO interrupt signals are generated on an inquiry/response basis, as shown in FIG. 39. That is, an interrupt signal should be driven active-low and remain in this state until the microprogram responds. This response may take the form of a pulse on a line of the IO bus 6 assigned for this purpose. The microprogram should not generate this response until it has determined which user device generated the interrupt.

External Condition Test: Each 10 Module accepts four external condition lines (not illustrated), load the lines' state into a parallel register at each system clock, and multiplexes the one selected by micro opcodes to a single line, NEXT. This active-low signal is applied to the processor as previously described.

The RA Select, Device Select, and A bus control fields address the external condition lines as follows:

1. The most significant 6 bits of RA Select and Device Select address the IO Module that is to present its external status to the NEXT line.
2. The least significant bit of RA select and Device Select address the even or odd pair of external condition lines on the selected IO Module.
3. A Bus Control selects the left or right external condition line of the even or odd pair, as follows:

| 00 | Right |
| 01 | Left |
| 10 | Right |
| 11 | Right |

Note that if A bus Control specifies Work A bus (00) or MAR to A Bus (11), the right sense line is selected.

From the foregoing, it should be apparent that a multiplicity of different input/output devices such as Teletype, Paper Taper Reader, Paper Tape Punch, Magnetic Tape, Disc, Printer or the like may be connected, within bandwidth limits, to the processor through the standard or special input/output modules. Specific details of particular device interfaces will not be described here as the techniques used in adapting same to the input/output modules are well within the capability of one skilled in the art of data processing.

What is claimed is:

1. In a microprocessor having first, second and third buses, a control memory having a plurality of control words stored therein at addressable locations at least some of said control words having a field containing an index value of which an instruction address is to be incremented, at least one register connected to said first and second buses with a second index value therein, at least a second field within said control word:
   means for placing an address of a control word on said first bus,
   means responsive to the contents of said second field of a control word for selecting said index value or said second index value,
   Means for placing said selected index value on said second bus,
   means for combining said address and said index value to produce a relative address, and
   means for addressing said control memory at a location specified by said relative address.

2. An addressing operation as set forth in claim 1 wherein said means for combining is an arithmetic and logic unit.

3. An addressing operation as set forth in claim 2 wherein said combustion is by addition.

4. An addressing operation as set forth in claim 2 wherein said combination is by substraction.

5. A microprocessor as set forth in claim 1 wherein said control words comprise a plurality of fields, at least some of which have more than one function.

6. In a microprocessor having first, second, and third buses, incrementing means connected between said first and third buses, storage means for storing microinstructions to be executed for controlling the operation of the microprocessor during successive clock periods, addressing means including second incrementing means providing for addresses of selected microinstructions for execution connected to said third bus, means for applying addresses of said address means and other addresses to said storage means, the operation comprising:
  a. executing a microinstruction at address X at clock period $n$ and simultaneously incrementing the address provided by said addressing means by one and fetching said incremented address X+1 for execution of its microinstruction during clock period $n$+1,
  b. executing the microinstruction of the incremented address at clock period $n$+1, which microinstruction contains a branch address Y,
  c. addressing said storage at address Y through said means for applying addresses during clock period $n$+1 for execution of said microinstruction at address Y during clock period $n$+2,
  d. placing said address Y on said first bus for application thereof to said incrementing means during clock period $n$+1,
  e. incrementing said address Y to Y+1 during clock period $n$+1 and placing address Y+1 via said third bus in said means for providing addresses for addressing said storage during clock period $n$+2.

7. The operation as set forth in claim 6 further comprising:
  a. executing the microinstruction at address Y+1 during clock period n+3 and simultaneously incrementing address Y+1 through said second incrementing means to Y+2 for execution during clock period $n$+4.

8. The operation as set forth in claim 6 wherein said incrementing by said incrementing means is performed by adding an increment to the address in an arithmetic unit.

9. The operation as set forth in claim 7 wherein said incrementing by said incrementing means is performed by adding an increment to the address in an arithmetic unit.

10. The operation as set forth in claim 6 wherein said incrementing by said second incrementing means is performed by adding an increment to the address in a microaddress register.

11. The operation as set forth in claim 7 wherein said incrementing by said second incrementing means is performed by adding an increment to the address in a microaddress register.

12. In a microprocessor having a first bus a second bus and a third bus, an arithmetic unit connected between said first, and third buses, storage means for storing control signals to be placed in a microcontrol register for controlling the operation of the microprocessor to execute control signals at successive clock intervals, an addressing means for said storage means connected to said third bus, and means allowing transfer of control signals from said microcontrol register to said storage, the operation comprising:
  a. decoding control signals at clock interval $n$, said control signals comprising a storage address X,
  b. addressing said storage at address X at clock interval $n$ to allow execution of the control signals at address X during clock interval $n$+1,
  c. placing address X on said first bus for application thereof to said arithmetic unit during clock interval $n$,
  d. adding "1" to said address X during clock interval $n$+1 and placing the result on said third bus whereby said X+1 address is applied to said storage address means during the same clock interval, and
  e. applying said X+1 address to said storage means to provide execution of the control signals at storage address X+1 in clock interval $n$+2.

* * * * *

UNITED STATES PATENT AND TRADEMARK OFFICE
CERTIFICATE OF CORRECTION

PATENT NO. : 3,943,495
DATED : March 9, 1976
INVENTOR(S) : Richard A. Garlic

It is certified that error appears in the above-identified patent and that said Letters Patent are hereby corrected as shown below:

Column 46, line 54 (indicated); after "value" delete "of" and insert --by--.

Column 47, line 5, delete "combustion" and insert --combination--.

Signed and Sealed this eleventh Day of May 1976

[SEAL]

Attest:

RUTH C. MASON
Attesting Officer

C. MARSHALL DANN
Commissioner of Patents and Trademarks